United States Patent
Matsukuma et al.

(10) Patent No.: US 9,248,574 B2
(45) Date of Patent: Feb. 2, 2016

(54) TEACHING DATA GENERATOR, ROBOT SYSTEM, AND METHOD FOR GENERATING TEACHING DATA

(71) Applicant: KABUSHIKI KAISHA YASKAWA DENKI, Kitakyushu-shi (JP)

(72) Inventors: Kenji Matsukuma, Kitakyushu (JP); Makoto Umeno, Kitakyushu (JP); Takashi Suyama, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 129 days.

(21) Appl. No.: 14/109,848

(22) Filed: Dec. 17, 2013

(65) Prior Publication Data

US 2014/0172167 A1    Jun. 19, 2014

(30) Foreign Application Priority Data

Dec. 18, 2012   (JP) .................. 2012-275601

(51) Int. Cl.
*G05B 15/00* (2006.01)
*G05B 19/00* (2006.01)
*B25J 9/16* (2006.01)

(52) U.S. Cl.
CPC ................ *B25J 9/1697* (2013.01); *B25J 9/161* (2013.01); *B25J 9/1671* (2013.01); *B25J 9/1692* (2013.01); *G05B 2219/37453* (2013.01); *G05B 2219/40323* (2013.01)

(58) Field of Classification Search
CPC ............ B25J 9/16; B25J 9/1633; B25J 9/161; B25J 9/1671; B25J 9/1692; B25J 9/1697; G05B 2219/36074; G05B 2219/36143; G05B 2219/36257; G05B 2219/40099; G05B 2219/45104; G05B 2219/37453; G05B 2219/40323; G05B 2219/40613

USPC .................. 700/245, 253, 254, 255, 259, 264
See application file for complete search history.

(56) References Cited

U.S. PATENT DOCUMENTS

| 5,937,143 A | * | 8/1999 | Watanabe et al. ............. 700/264 |
| 6,167,328 A | | 12/2000 | Takaoka et al. |

(Continued)

FOREIGN PATENT DOCUMENTS

| CN | 1798637 | 7/2006 |
| CN | 1939678 | 4/2007 |

(Continued)

OTHER PUBLICATIONS

Japanese Office Action for corresponding JP Application No. 2012-275601, Jan. 16, 2014.

(Continued)

*Primary Examiner* — Jason Holloway
*Assistant Examiner* — Rachid Bendidi
(74) *Attorney, Agent, or Firm* — Mori & Ward, LLP

(57) ABSTRACT

A teaching data generator includes a storage device. An arithmetic device includes a first window display section to cause a display device to display a first window displaying first images respectively corresponding to some pieces of work unit job data stored in the storage device and included in teaching data. The first images are arranged in an execution order of pieces of work respectively corresponding to the some pieces of the work unit job data. A first job editing section performs an editing operation including replacing the some pieces of the work unit job data with other pieces of the work unit job data stored in the storage device, and changing the execution order. A teaching data generation section generates the teaching data based on a display content of the first window changed in accordance with the editing operation.

20 Claims, 16 Drawing Sheets

(56) References Cited

U.S. PATENT DOCUMENTS

| | | | |
|---|---|---|---|
| 6,470,235 B2 * | 10/2002 | Kasuga et al. | 700/246 |
| 6,718,231 B2 * | 4/2004 | Konno et al. | 700/245 |
| 2002/0147528 A1 * | 10/2002 | Watanabe et al. | 700/245 |
| 2007/0073444 A1 | 3/2007 | Kobayashi et al. | |
| 2010/0125363 A1 * | 5/2010 | Sakaguchi et al. | 700/248 |
| 2011/0010009 A1 * | 1/2011 | Saito | 700/253 |
| 2011/0288667 A1 * | 11/2011 | Noda et al. | 700/98 |
| 2012/0136481 A1 * | 5/2012 | Maisonnier et al. | 700/257 |

FOREIGN PATENT DOCUMENTS

| | | |
|---|---|---|
| JP | 2002-120174 | 4/2002 |
| JP | 2007-242054 | 9/2007 |
| JP | 2011-108156 | 6/2011 |
| JP | 2012-091304 | 5/2012 |

OTHER PUBLICATIONS

Chinese Office Action for corresponding on Application No. 2013 0599679.3, Jun. 30, 2016.

* cited by examiner

FIG. 4

| Job data | Parameter information |
|---|---|
| Job data A | Parameter information A |
| Job data B | Parameter information B |
| ⋮ | ⋮ |
| Job data C | Parameter information C |
| Job data D | Parameter information D |
| Job data E | Parameter information E |
| Job data F | Parameter information F |
| Job data G | Parameter information G |
| ⋮ | ⋮ |
| Job data H | Parameter information H |
| Job data I | Parameter information I |
| ⋮ | ⋮ |

TEACHING DATA GENERATOR, ROBOT SYSTEM, AND METHOD FOR GENERATING TEACHING DATA

CROSS-REFERENCE TO RELATED APPLICATIONS

The present application claims priority under 35 U.S.C. §119 to Japanese Patent Application No. 2012-275601, filed Dec. 18, 2012. The contents of this application are incorporated herein by reference in their entirety.

BACKGROUND

1. Field of the Invention

The present invention relates to a teaching data generator, a robot system, and a method for generating teaching data.

2. Discussion of the Background

Japanese Unexamined Patent Application Publication No. 2012-91304 discloses teaching data generators are known to generate or edit teaching data that specifies motions of robots.

SUMMARY

According to one aspect of the present invention, a teaching data generator includes a storage device, a display device, an input device, and an arithmetic device. The storage device is configured to store at least one piece of teaching data that is to be generated or edited to specify a motion form of a robot. The display device is configured to make a predetermined display based on the at least one piece of teaching data stored in the storage device, and is configured to store a plurality of pieces of work unit job data each specifying a motion form of the robot on a work basis. The plurality of pieces of work unit job data each include one of a plurality of pieces of job data or a combination of some of the plurality of pieces of job data. The plurality of pieces of job data each specify a predetermined motion of the robot and are applicable as a part of the at least one piece of teaching data. Through the input device, information is input. The arithmetic device is configured to control an operation of the storage device and an operation of the display device, and is configured to receive the information input from the input device. The arithmetic device includes a first window display section, a first job editing section, and a teaching data generation section. The first window display section is configured to cause the display device to display a first window displaying a plurality of first images respectively corresponding to some pieces of the work unit job data that are among the plurality of pieces of work unit job data stored in the storage device and that are included in the at least one piece of teaching data. The plurality of first images are arranged in an order in which pieces of work respectively corresponding to the some pieces of the work unit job data are executed. The first job editing section is configured to, in response to the information input from the input device, perform an editing operation including replacing the some pieces of the work unit job data respectively corresponding to the plurality of first images with other pieces of the work unit job data stored in the storage device, and changing the order in which the pieces of work respectively corresponding to the some pieces of the work unit job data are executed. The teaching data generation section is configured to generate the at least one piece of teaching data based on a display content of the first window that has been changed in accordance with the editing operation performed by the first job editing section.

According to another aspect of the present invention, a robot system includes a robot, the above-described teaching data generator, and a robot controller. The teaching data generator is configured to generate or edit a piece of teaching data that specifies a motion form of the robot. The robot controller is configured to control the robot to move based on the piece of teaching data generated or edited by the teaching data generator.

According to the other aspect of the present invention, a method is for generating teaching data generated or edited to specify a motion form of a robot. The method includes displaying a window displaying a plurality of images respectively corresponding to some pieces of work unit job data that are among a plurality of pieces of stored work unit job data and that are included in at least one piece of teaching data. The plurality of images are arranged in an order in which pieces of work respectively corresponding to the some pieces of work unit job data are executed. The plurality of pieces of stored work unit job data each specify a motion form of the robot on a work basis. The plurality of pieces of work unit job data each include one of a plurality of pieces of job data or a combination of some of the plurality of pieces of job data. The plurality of pieces of job data each specify a predetermined motion of the robot and are applicable as a part of the at least one piece of teaching data. An editing operation is performed including replacing the some pieces of the stored work unit job data respectively corresponding to the plurality of images with other pieces of the stored work unit job data, and changing the order in which the pieces of work respectively corresponding to the some pieces of the stored work unit job data are executed. The at least one piece of teaching data is generated based on a display content of the window that has been changed in accordance with the editing operation performed in the editing step.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 illustrates an exemplary storage content of a storage device;

DESCRIPTION OF THE EMBODIMENTS

Figure 1:
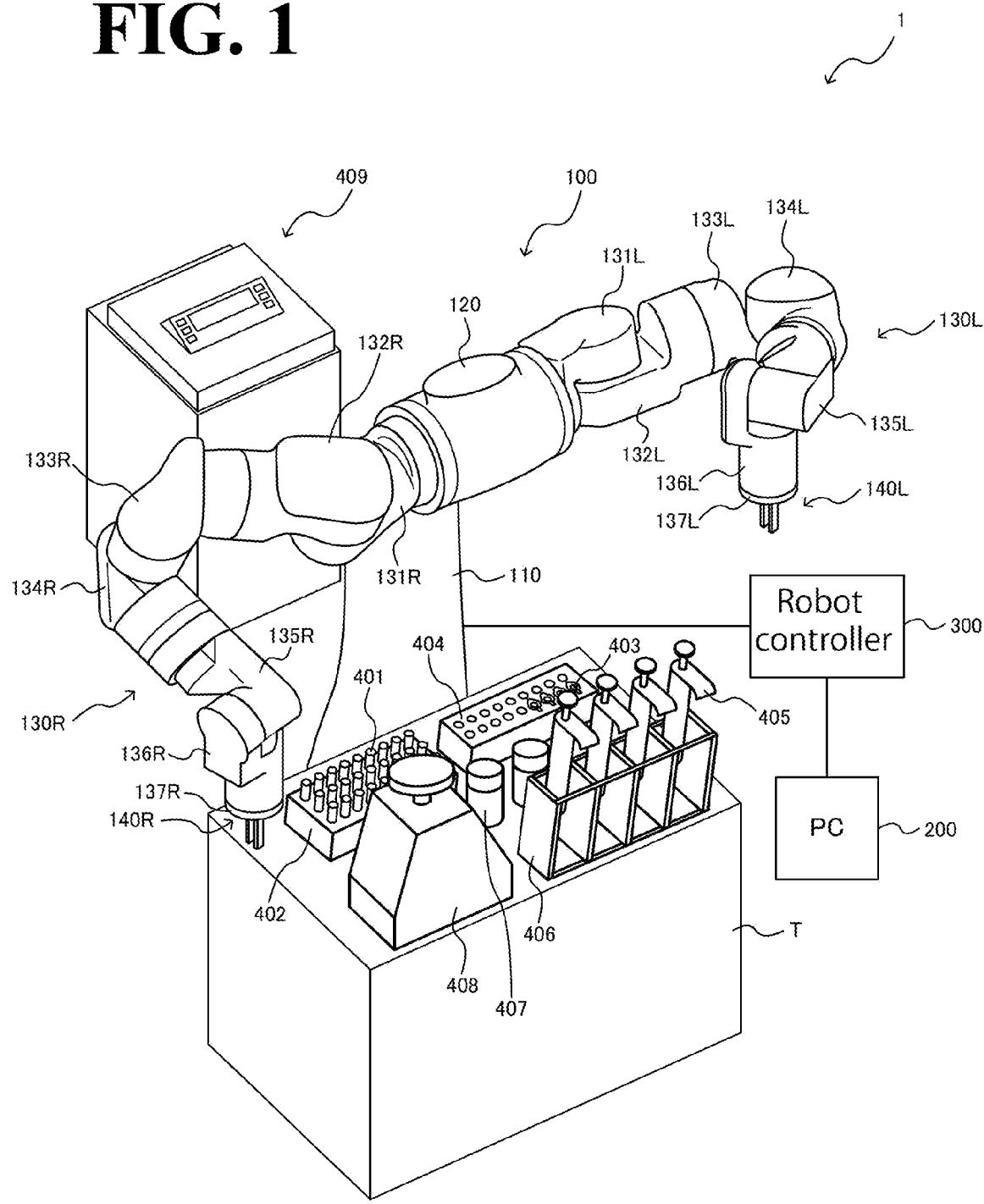
FIG. 1 is a system configuration diagram illustrating a general arrangement of a robot system according to an embodiment.

The embodiments will now be described with reference to the accompanying drawings, wherein like reference numerals designate corresponding or identical elements throughout the various drawings.

First, a general arrangement of a robot system according to this embodiment will be described.

As shown in FIG. 1, a robot system 1 according to this embodiment includes a robot 100, a PC (Personal Computer) 200 (teaching data generator), and a robot controller 300.

The robot 100 is coupled to the robot controller 300 in a mutually communicative manner. The robot 100 has its motions controlled by the robot controller 300 and thus is capable of performing a plurality of kinds of processing (detailed later) with respect to a specimen (which is a to-be-processed object such as blood, cerebrospinal fluid, urine, and partial tissue), not shown. There is no particular limitation to the robot 100 insofar as the robot 100 is capable of performing a plurality of kinds of processing with respect to the specimen. In this embodiment, the robot 100 is what is called a two-arm robot that includes a base 110, a body 120, and two arms 130L and 130R.

The base 110 stands upright on and is secured to the installed position (which is, in this embodiment, the floor, not shown) of the robot 100 by an anchor bolt, not shown. It is noted that the base 110 may be secured to a position other than the floor (for example, the ceiling and a wall, not shown).

The body 120 is coupled to the distal end of the base 110 in a rotatable manner about a rotation axis that is approximately perpendicular to the surface to which the base 110 is secured (which is, in this embodiment, the floor) and that is not shown.

The arms 130L and 130R have mutually symmetric structures and are respectively coupled to one end and another end of the body 120 in a rotatable manner.

The arm 130L includes a shoulder 131L, an upper arm A part 132L, an upper arm B part 133L, a lower arm 134L, a wrist A part 135L, a wrist B part 136L, and a flange 137L, as seen from the base end side (the body 120 side) to the opposite, distal end side of the arm 130L.

The shoulder 131L is coupled to the one end of the body 120 in a rotatable manner about a rotation axis that is approximately along the longitudinal direction of the arm 130L and that is not shown.

The upper arm A part 132L is coupled to the distal end of the shoulder 131L in a rotatable manner about a rotation axis that is approximately perpendicular to the longitudinal direction of the arm 130L and that is not shown.

The upper arm B part 133L is coupled to the distal end of the upper arm A part 132L in a rotatable manner about a rotation axis that is approximately along the longitudinal direction of the arm 130L and that is not shown.

The lower arm 134L is coupled to the distal end of the upper arm B part 133L in a rotatable manner about a rotation axis that is approximately perpendicular to the longitudinal direction of the arm 130L and that is not shown.

The wrist A part 135L is coupled to the distal end of the lower arm 134L in a rotatable manner about a rotation axis that is approximately along the longitudinal direction of the arm 130L and that is not shown.

The wrist B part 136L is coupled to the distal end of the wrist A part 135L in a rotatable manner about a rotation axis that is approximately perpendicular to the longitudinal direction of the arm 130L and that is not shown.

The flange 137L is coupled to the distal end of the wrist B part 136L in a rotatable manner about a rotation axis that is approximately along the longitudinal direction of the arm 130L and that is not shown. To the distal end of the flange 137L, a hand 140L is mounted. The hand 140L is capable of handling pieces of processing equipment, described later. Also the hand 140L is rotated in conjunction with the rotation of the flange 137L.

On the other hand, the arm 130R includes a shoulder 131R, an upper arm A part 132R, an upper arm B part 133R, a lower arm 134R, a wrist A part 135R, a wrist B part 136R, and a flange 137R, as seen from the base end side (the body 120 side) to the opposite, distal end side of the arm 130R.

The shoulder 131R is coupled to the other end of the body 120 in a rotatable manner about a rotation axis that is approximately along the longitudinal direction of the arm 130R and that is not shown.

The upper arm A part 132R is coupled to the distal end of the shoulder 131R in a rotatable manner about a rotation axis that is approximately perpendicular to the longitudinal direction of the arm 130R and that is not shown.

The upper arm B part 133R is coupled to the distal end of the upper arm A part 132R in a rotatable manner about a rotation axis that is approximately along the longitudinal direction of the arm 130R and that is not shown.

The lower arm 134R is coupled to the distal end of the upper arm B part 133R in a rotatable manner about a rotation axis that is approximately perpendicular to the longitudinal direction of the arm 130R and that is not shown.

The wrist A part 135R is coupled to the distal end of the lower arm 134R in a rotatable manner about a rotation axis that is approximately along the longitudinal direction of the arm 130R and that is not shown.

The wrist B part 136R is coupled to the distal end of the wrist A part 135R in a rotatable manner about a rotation axis that is approximately perpendicular to the longitudinal direction of the arm 130R and that is not shown.

The flange 137R is coupled to the distal end of the wrist B part 136R in a rotatable manner about a rotation axis that is approximately along the longitudinal direction of the arm 130R and that is not shown. To the distal end of the flange 137R, a hand 140R is mounted. The hand 140R is capable of handling pieces of processing equipment, described later. Also the hand 140R is rotated in conjunction with the rotation of the flange 137R.

Within the movable range of the robot 100, a plurality of pieces of processing equipment are disposed. The plurality of pieces of processing equipment are necessary for the robot 100 to perform processing with respect to the specimen. In this example, the pieces of processing equipment include tubes 401, a tube rack 402, pipettes 403, a pipette track 404, chips 405, a chip rack 406, reagent bottles 407, a mixer 408, which are disposed on a table T, and a centrifuge 409, which is disposed on the floor.

The tubes 401 (which are, in this embodiment, microtubes) contain specimens. The tube rack 402 accommodates the plurality of tubes 401 in upright orientation.

The pipettes 403 (which are, in this embodiment, micropipettes) each are a piece of equipment that sucks/injects liquid by an amount set in advance. The pipette track 404 accommodates the plurality of pipettes 403 in upright orientation. The plurality of pipettes 403 are different from each other in the amount of suction/injection set in advance.

The chips 405 are cartridges that are to be mounted to the distal ends of the respective, corresponding pipettes 403 at the time when the pipettes 403 suck/inject liquid. The chip rack 406 accommodates the plurality of chips 405 in upright orientation.

The reagent bottles 407 contain reagents.

The mixer 408 (which is, in this embodiment, what is called a vortex mixer) is a piece of equipment that, when pressed by a tube 401, rotates the bottom of the tube 401 at high speed so as to mix the content of the tube 401.

The centrifuge 409 is a piece of equipment that, when the tube 401 is set in the centrifuge 409, isolates or fractionates the components of the content of the tube 401 by centrifugal force.

The PC 200 is coupled to the robot controller 300 in a mutually communicative manner. The PC 200 generates or edits teaching data that specifies motion forms of the robot 100 (for example, the angles of the joints and the positions of the control points) related to any of a plurality of kinds of processing with respect to the specimen. Also the PC 200 is capable of outputting the generated or edited teaching data to the robot controller 300, and capable of acquiring and storing teaching data from the robot controller 300 or other apparatuses. It is noted that a configuration and a function of the PC 200 will be described in detail later.

The robot controller 300 includes a computer that includes a storage device, an arithmetic device, and other devices (all of which are not shown). The robot controller 300 is coupled to the robot 100 and the PC 200 in a mutually communicative manner. The arithmetic device of the robot controller 300 is capable of outputting to the PC 200 teaching data stored in the storage device, and capable of acquiring teaching data from the PC 200 and other apparatuses and storing the teaching data in the storage device. Then, based on the teaching data stored in the storage device, the arithmetic device of the robot controller 300 causes the robot 100 to move and perform processing with respect to the specimen.

Next, description will be made with regard to kinds of processing that the robot 100 is capable of performing with respect to the specimen.

Figure 2:
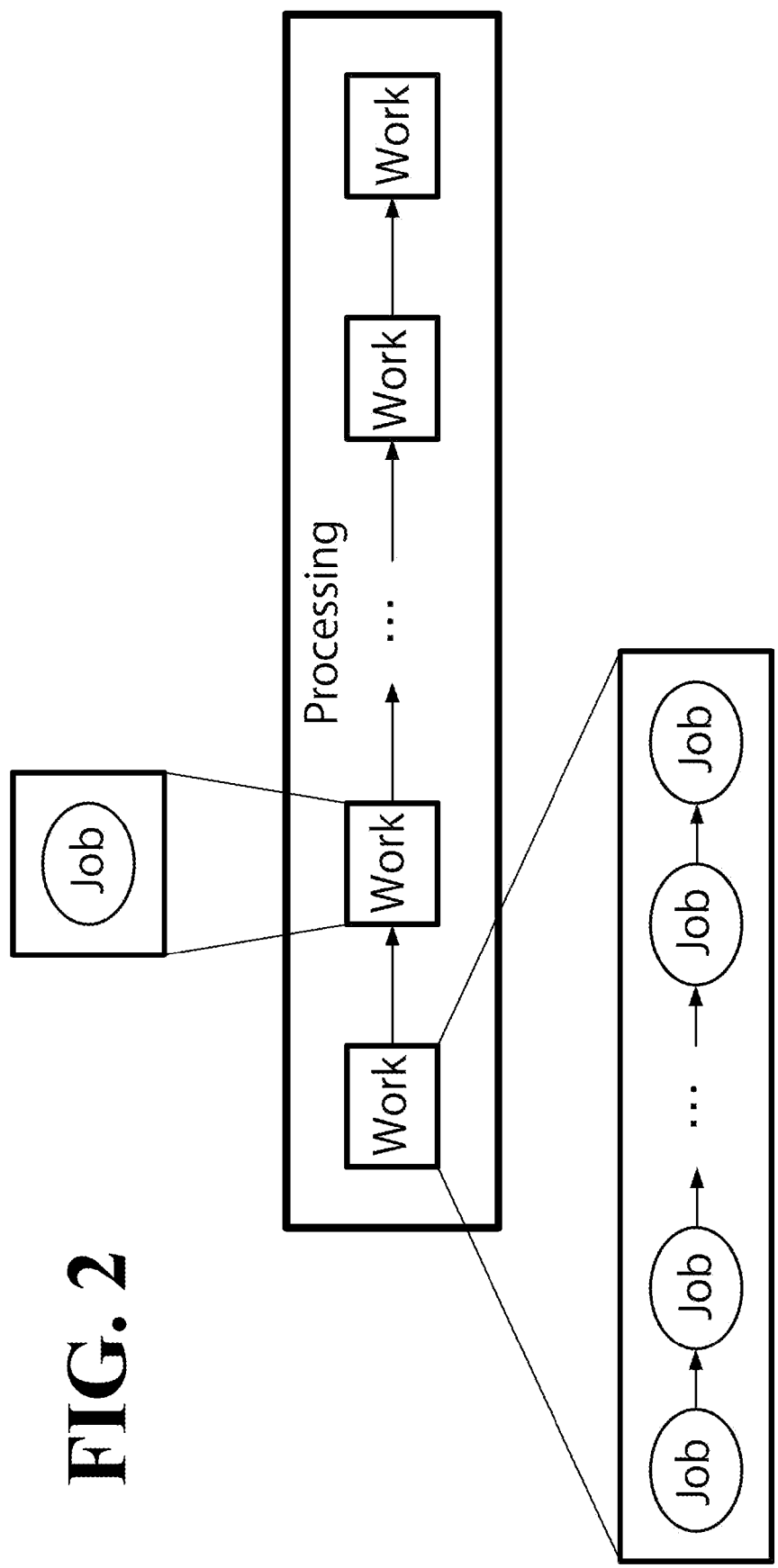
FIG. 2 schematically illustrates a configuration of one processing that a robot is capable of performing with respect to a specimen.

As shown in FIG. 2, each processing that the robot 100 is capable of performing with respect to the specimen is a combination of a plurality of pieces of meaningful work that are performed by the robot 100 and that are arranged in a time-series manner.

Examples of the work include a motion of taking up a tube 401, a motion of dispensing a reagent, a motion of mixing the content of the tube 401, and a motion of extracting a desired component of the specimen in the tube 401.

Each of the work is made up of a job, which is one (single) predetermined motion to be performed by the robot 100 (regardless of whether the motion is a meaningful motion or a meaningless motion), or each of the work is made up of a combination of a plurality of jobs that are to be performed by the robot 100 and that are arranged in a time-series manner. When a piece of work is made up of one job (hereinafter occasionally referred to as a "single job"), the one job by itself can be viewed as a meaningful motion. When a piece of work is made up of a combination of a plurality of jobs arranged in a time-series manner (hereinafter occasionally referred to as a "job complex"), the plurality of jobs together make up a meaningful motion when they are combined together and arranged in a time-series manner.

Examples of the jobs include a job of taking up a tube 401, a job of accommodating the tube 401, a job of opening the lid of the tube 401, a job of closing the lid of the tube 401, a job of taking up a pipette 403, a job of accommodating the pipette 403, a job of mounting a chip 405 to the distal end of the pipette 403, a job of removing the chip 405 from the distal end of the pipette 403, a job of sucking liquid by a predetermined amount using the pipette 403, a job of injecting liquid by a predetermined amount using the pipette 403, a job of opening the lid of a reagent bottle 407, a job of closing the lid of the reagent bottle 407, a job of pressing the tube 401 against the mixer 408 and turning the mixer 408 into operation, a job of opening the lid of the centrifuge 409, a job of closing the lid of the centrifuge 409, a job of setting the tube 401 into the centrifuge 409, a job of taking up the tube 401 out of the centrifuge 409, a job of starting the centrifuge 409 into centrifugal separation, and a job of ending centrifugal separation of the centrifuge 409.

Next, a configuration of the PC 200 will be described.

Figure 3:
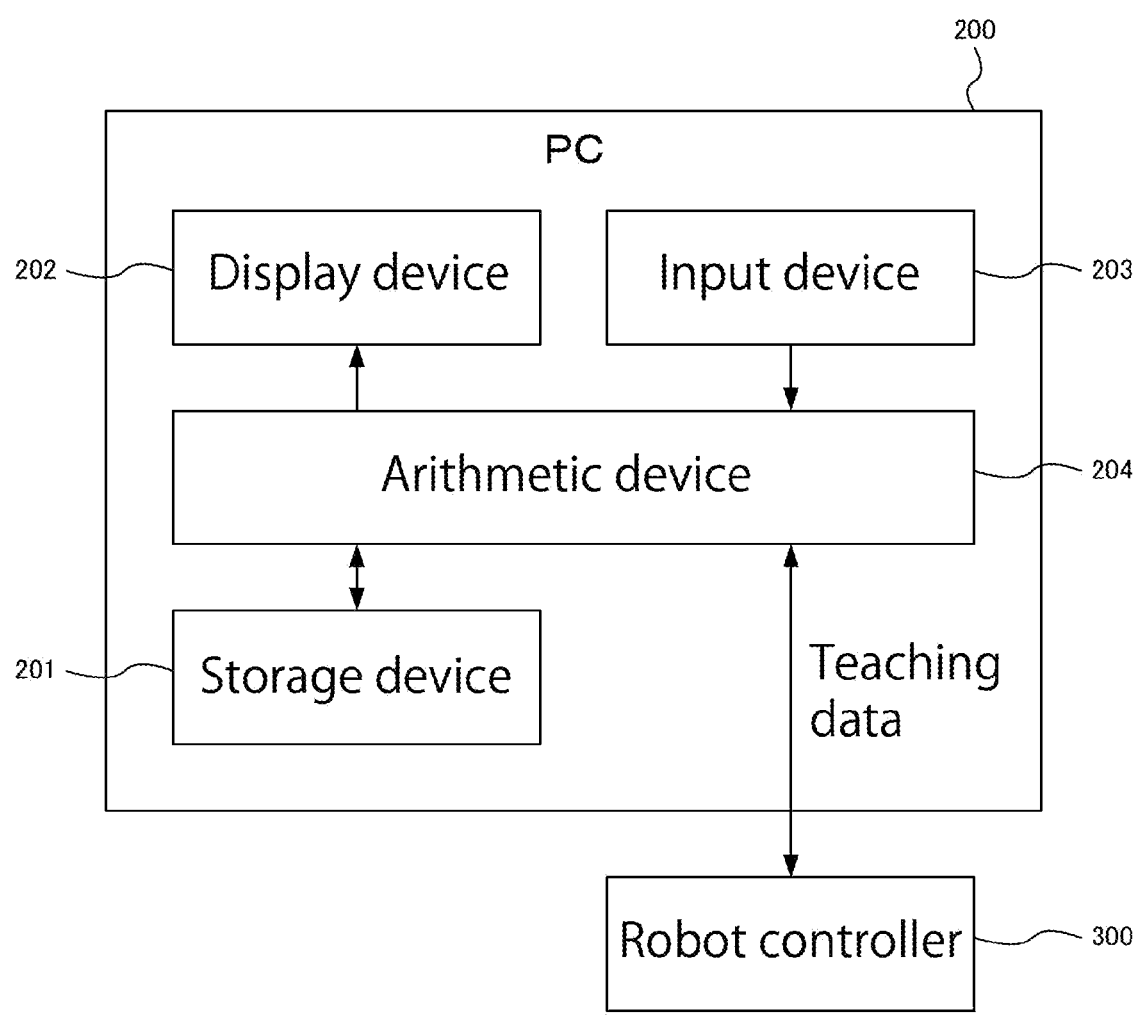
FIG. 3 is a block diagram illustrating a configuration of a PC.

As shown in FIG. 3, the PC 200 includes a storage device 201, a display device 202, an input device 203, and an arithmetic device 204.

The storage device 201 is made up of a hard disc, for example. The storage device 201 stores a plurality of pieces of teaching data. Each teaching data includes data of a combination of a plurality of pieces of work unit job data associated with a combination of a plurality of pieces of work constituting the processing that each teaching data specifies.

Each work unit job data is a piece of data that specifies a motion form of the robot 100 on a work unit basis. Also each work unit job data is made up of one piece of job data or a combination of a plurality of pieces of job data, where the one piece of job data is associated with one job constituting the work that each work unit job data specifies, while the combination of the plurality of pieces of job data is associated with a plurality of jobs constituting the work that each work unit job data specifies. Specifically, the work unit job data associated with a single job (such work unit job data will be hereinafter occasionally referred to as "single job data") is made up of one piece of job data. The work unit job data associated with a job complex (such work unit job data will be hereinafter occasionally referred to as "job data complex") is made up of a combination of a plurality of pieces of job data.

Each job data is a piece of data that specifies a motion form of the robot 100 associated with a job.

Also each teaching data includes parameter information. The parameter information indicates one or more motion parameters associated with each of the jobs of the robot 100 specified by each job data constituting each work unit job data included in each teaching data.

Examples of the motion parameter include those associated with pressing a tube 401 against the mixer 408 to turn the mixer 408 into operation, such as the period of time for which the tube 401 is pressed against the mixer 408 (that is, mixing time), and the pressing force (that is, mixing speed).

In this embodiment, as shown in FIG. 4, the plurality of pieces of job data are related, in a database form, to the respective pieces of parameter information, which are for the plurality of jobs specified by the plurality of pieces of job data. This database is stored in the storage device 201.

The display device 202 shown in FIG. 3 is made up of, for example, a liquid crystal display. The display device 202 makes various kinds of display such as a predetermined display (detailed later) that is based on the teaching data stored in the storage device 201.

The input device 203 is made up of, for example, a keyboard, a mouse, and a touch panel. The input device 203 is capable of receiving various kinds of information input by an operator's input operation.

The arithmetic device 204 is made up of, for example, a central processing unit (CPU). The arithmetic device 204 controls the operation of the storage device 201 and the operation of the display device 202, and receives information input from the input device 203, thereby controlling the PC 200 as a whole.

Next, a functional configuration of the arithmetic device 204 will be described.

Figure 5:
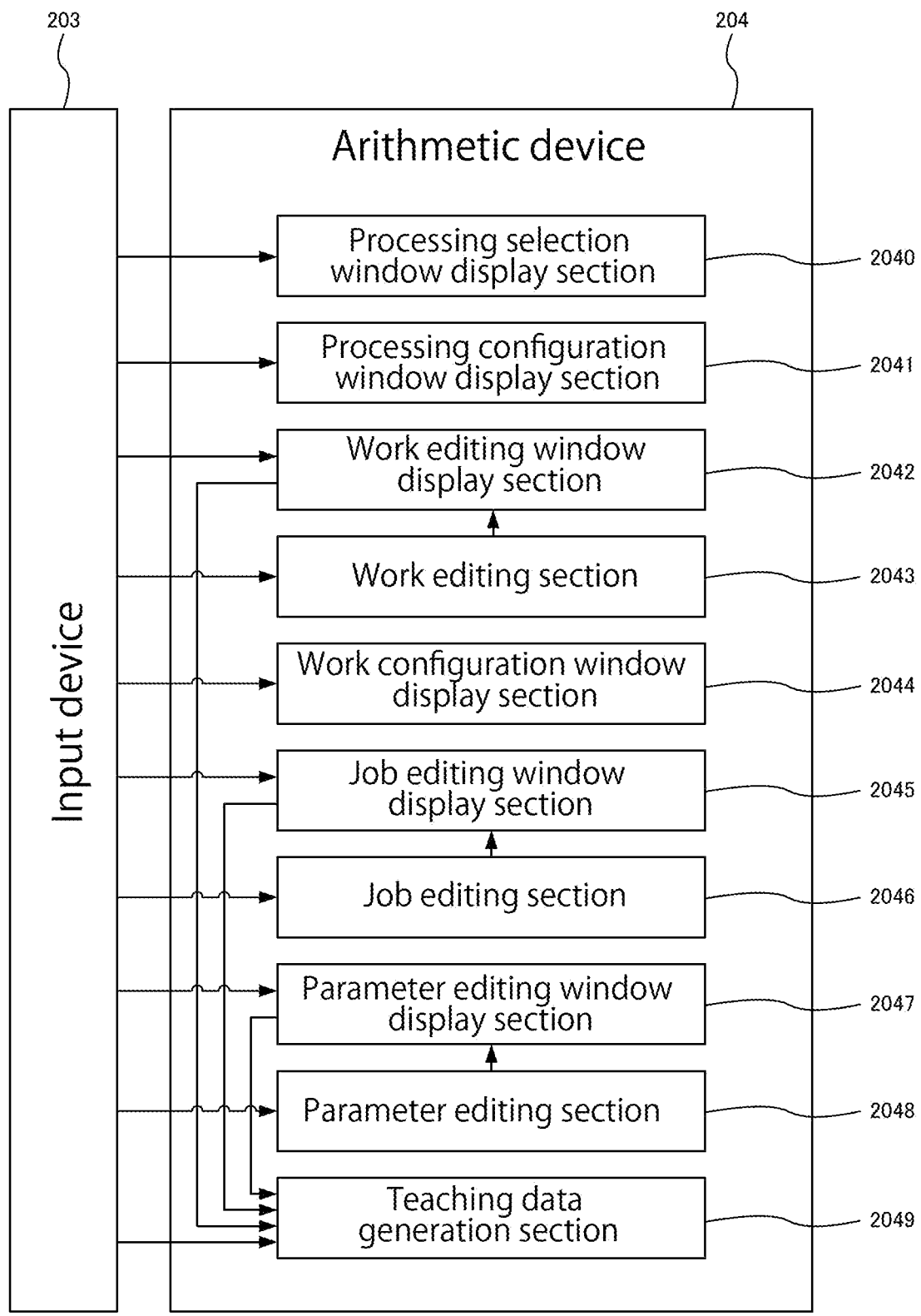
FIG. 5 is a functional block diagram illustrating a configuration of an arithmetic device.

As shown in FIG. 5, the arithmetic device 204 includes a processing selection window display section 2040, a processing configuration window display section 2041, a work editing window display section 2042, a work editing section 2043 (first job editing section), a work configuration window display section 2044, a job editing window display section 2045, a job editing section 2046 (second job editing section), a parameter editing window display section 2047 (parameter display window display section), a parameter editing section 2048, and a teaching data generation section 2049. It is noted that the processing configuration window display section 2041 and the work editing window display section 2042 correspond to the first window display section, and the processing configuration window display section 2041 also corresponds to the second job selection window display section. The work configuration window display section 2044 and the job editing window display section 2045 correspond to the second window display section, and the job editing window display section 2045 also corresponds to the first job selection window display section.

The processing selection window display section 2040 causes the display device 202 to display a processing selection window D1 (see FIG. 6, described below) when a predetermined operation has been performed.

Figure 6:
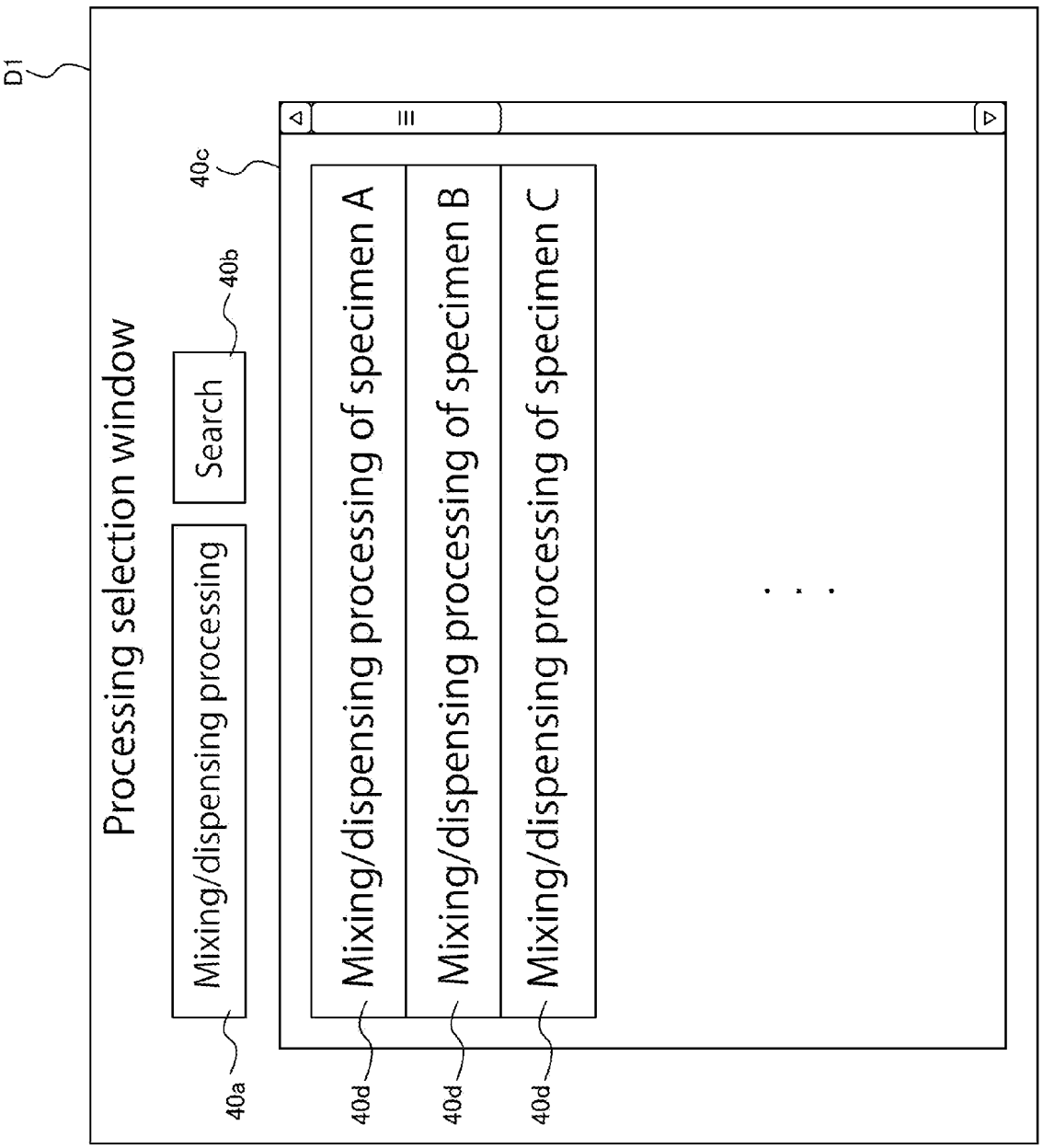
FIG. 6 illustrates an exemplary processing selection window.

As shown in FIG. 6, the processing selection window D1 includes a search input box 40a, a "Search" button 40b, and a search result display area 40c.

The search input box 40a is a form into which search target information (for example, title) associated with a desired piece of teaching data can be input by an input operation with respect to the input device 203. In the example shown in FIG. 6, "Mixing/dispensing processing" is input in the search input box 40a.

The "Search" button 40b is a form to start a search based on the input content of the search input box 40a. The operator can handle the "Search" button 40b by the operator's input operation with respect to the input device 203.

The search result display area 40c is an area that displays the result of the above-described search. The search result display area 40c lists buttons 40d indicating hits of teaching data that the search has returned among the plurality of pieces of teaching data stored in the storage device 201. In the example shown in FIG. 6, the search result display area 40c lists a "Mixing/dispensing processing of specimen A" button 40d, a "Mixing/dispensing processing of specimen B" button 40d, and a "Mixing/dispensing processing of specimen C" button 40d. The operator, by performing an input operation with respect to the input device 203, performs a selection operation with respect to a button 40d, among the buttons 40d displayed in the search result display area 40c, that indicates the desired piece of teaching data. In this manner, the operator can select the teaching data.

When the selection operation is performed with respect to the one button 40d in the processing selection window D1 and thus one piece of teaching data is selected, then the processing configuration window display section 2041 causes the display device 202 to display the processing configuration window D2 (see FIG. 7, described below).

Figure 7:
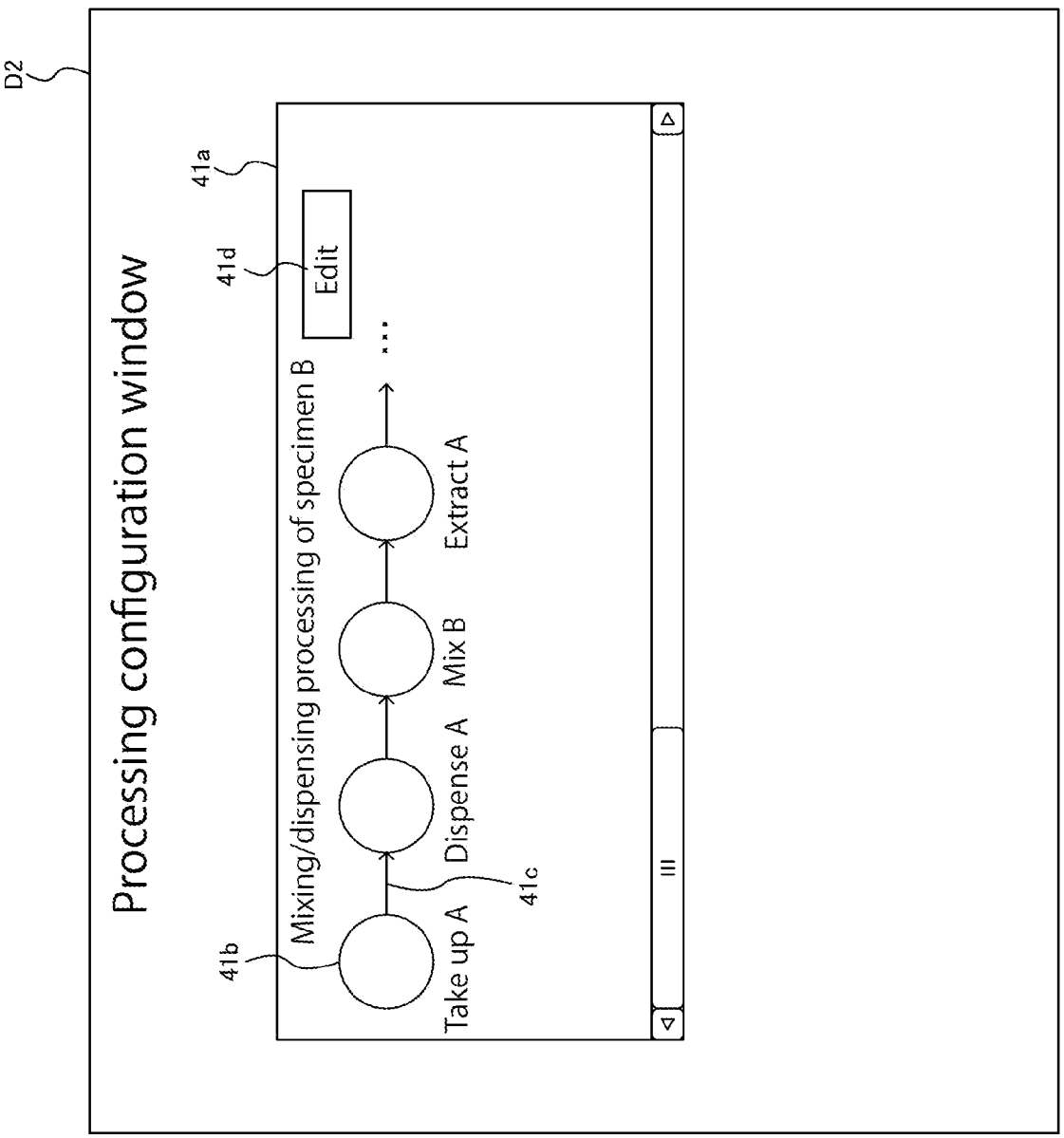
FIG. 7 illustrates another exemplary processing selection window.

As shown in FIG. 7, the processing configuration window D2 includes a processing configuration display area 41a. The processing configuration display area 41a displays a plurality of icons 41b (which correspond to the first images and to the images), a plurality of arrows 41c (which correspond to the coupling identifiers), and an "Edit" button 41d.

The plurality of icons 41b respectively indicate some pieces of work unit job data that are among the plurality of pieces of work unit job data stored in the storage device 201 and that are included in the one piece of teaching data that corresponds to the one button 40d that has been selected in the selection operation in the processing selection window D1. The plurality of arrows 41c couple the plurality of icons 41b to each other in an order in which pieces of work respectively corresponding to the some pieces of work unit job data are executed. That is, the plurality of icons 41b are coupled to each other by the plurality of arrows 41c and thus are arranged in the order in which the pieces of work respectively corresponding to the some pieces of work unit job data are executed. In the example shown in FIG. 7, a "Take up A" icon 41b, a "Dispense A" icon 41b, a "Mix B" icon 41b, an "Extract A" icon 41b, and other icons 41b are coupled to each other by the arrows 41c in the order in which the pieces of work respectively corresponding to the some pieces of work unit job data are executed. In this manner, the plurality of icons 41b are arranged in the order in which the pieces of work respectively corresponding to the some pieces of work unit job data are executed. The operator, by performing an input operation with respect to the input device 203, performs a selection operation with respect to an icon 41b, among the plurality of icons 41b displayed in the processing configuration display area 41a, that indicates the desired piece of work unit job data. In this manner, the operator can select the work unit job data.

The "Edit" button 41d is a form to perform an editing operation with respect to a plurality of pieces of work unit job data included in the one piece of teaching data that corresponds to the one button 40d that has been selected in the selection operation in the processing selection window D1. The operator can handle the "Edit" button 41d by performing an input operation with respect to the input device 203.

When the "Edit" button 41d in the processing configuration window D2 is handled, the work editing window display section 2042 causes the display device 202 to display a work editing window D3 (see FIG. 8, described below).

Figure 8:
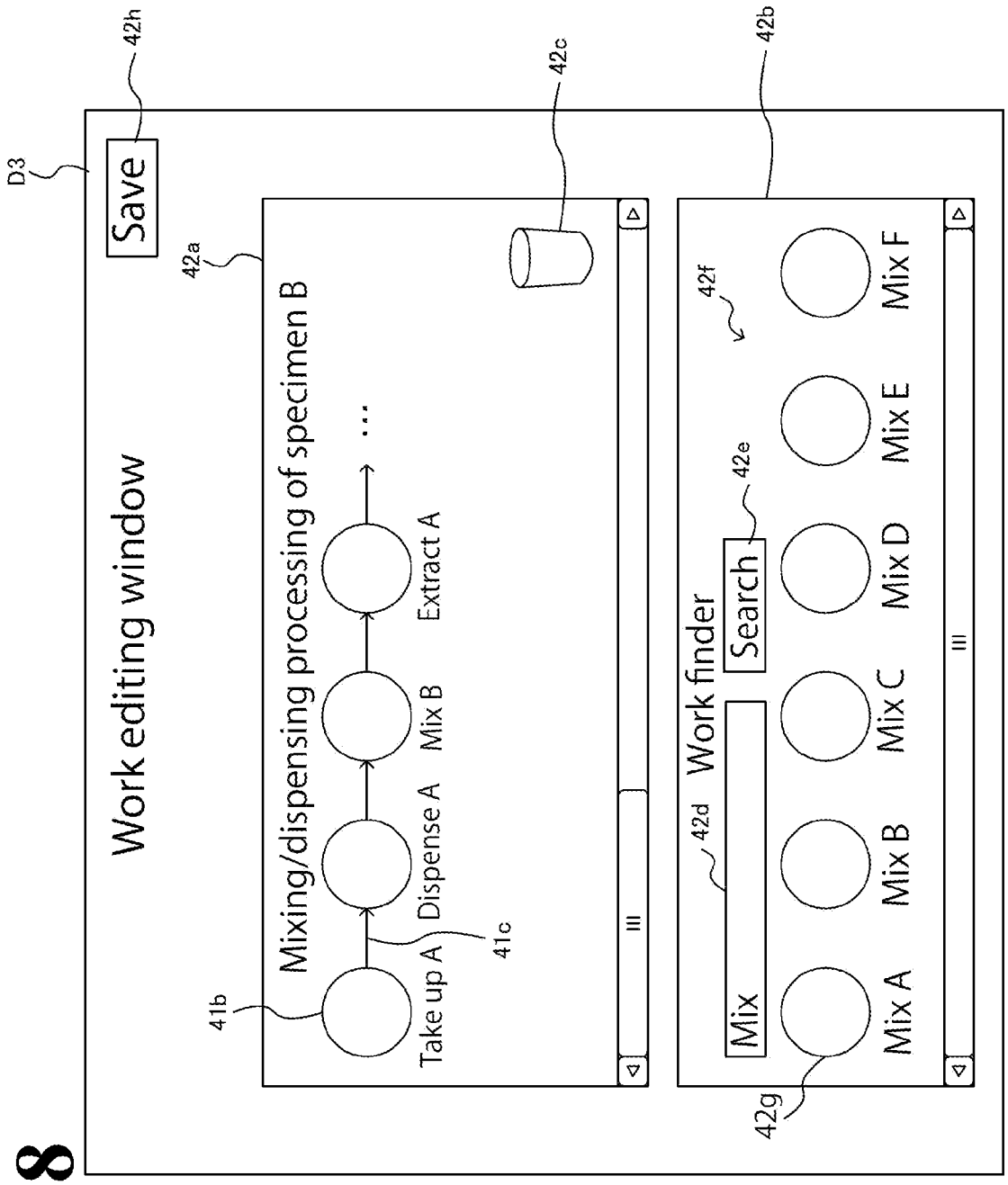
FIG. 8 illustrates another exemplary processing selection window.

As shown in FIG. 8, the work editing window D3 includes a processing configuration display area 42a, a replacing work display area 42b, and a "Save" button 42h.

The processing configuration display area 42a displays a similar content to the display content of the processing configuration display area 41a in the processing configuration window D2, and also displays a Recycle Bin icon 42c.

The replacing work display area 42b displays a search input box 42d, a "Search" button 42e, and a search result display area 42f.

The search input box 42d is a form into which search target information (for example, title) associated with a desired piece of work unit job data can be input by an input operation with respect to the input device 203. In the example shown in FIG. 8, "mix" is input in the search input box 42d.

The "Search" button 42e is a form to start a search based on the input content of the search input box 42d. The operator can handle the "Search" button 42e by performing an input operation with respect to the input device 203.

The search result display area 42f is an area that displays the result of the above-described search. The search result display area 42f lists icons 42g (which correspond to the third images) indicating hits of work unit job data (including other pieces of work unit job data than the pieces of work unit job data corresponding to the icons 41b displayed in the processing configuration display area 42a) that the search has returned among the plurality of pieces of work unit job data stored in the storage device 201. In the example shown in FIG. 6, the search result display area 42f lists a "Mix A" icon 42g, a "Mix B" icon 42g, a "Mix C" icon 42g, a "Mix D" icon 42g, a "Mix E" icon 42g, a "Mix F" icon 42g, and other icons 42g.

It is noted that the processing configuration window D2 and the work editing window D3 correspond to the first window and the display window, and the processing configuration window D2 also corresponds to the second job selection window.

Figure 9:
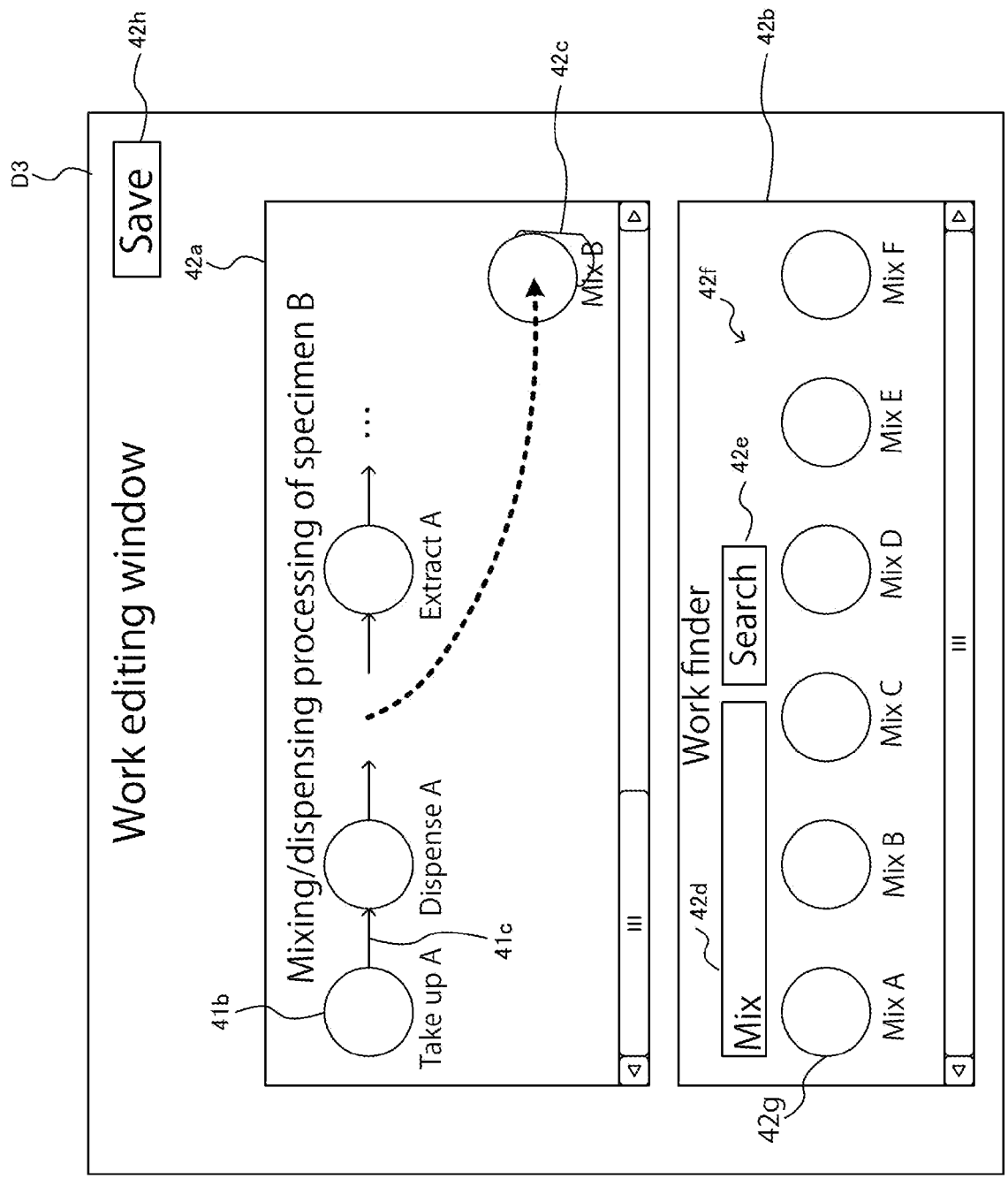
FIG. 9 illustrates another exemplary processing selection window.
Figure 10:
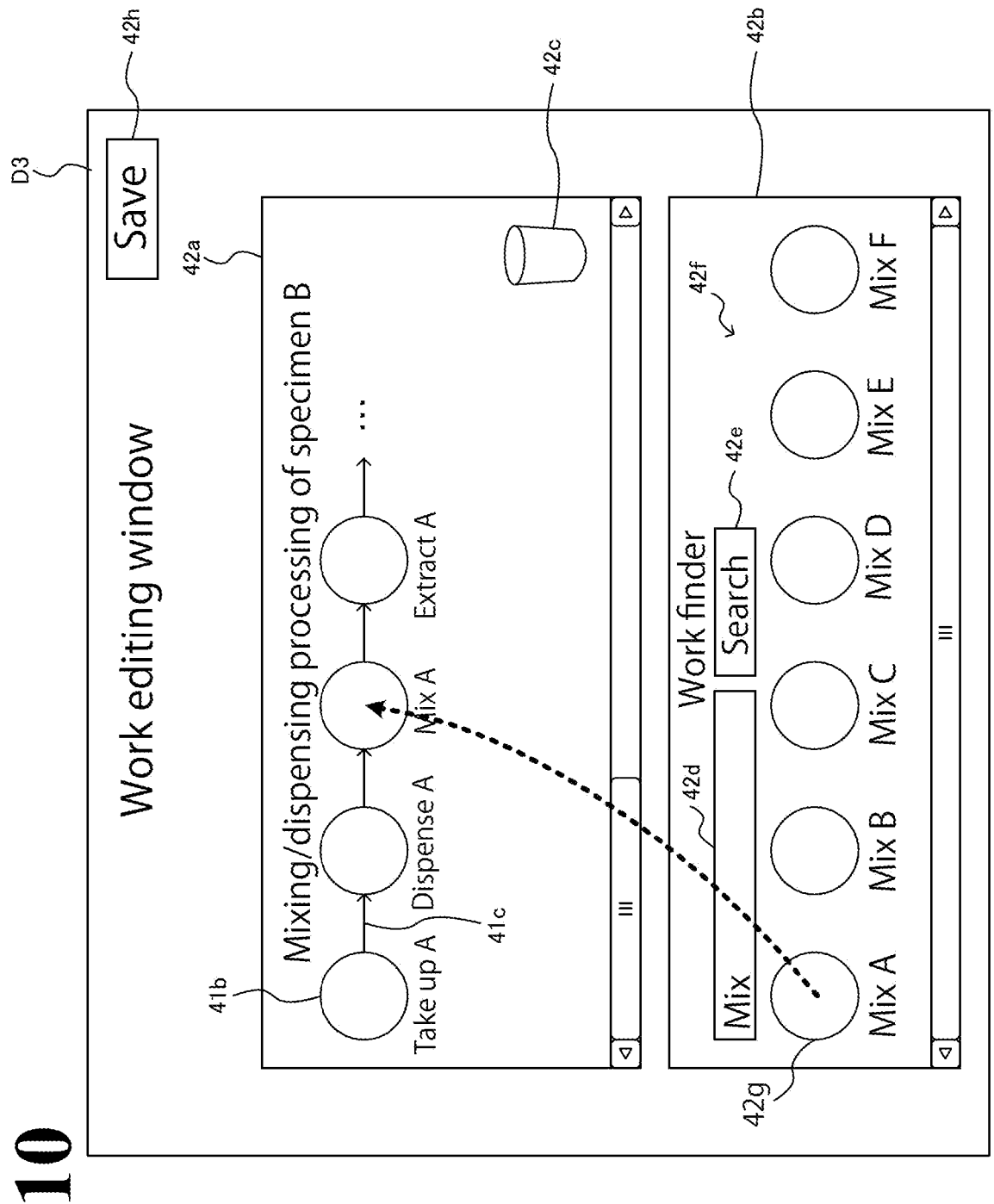
FIG. 10 illustrates another exemplary processing selection window.
Figure 11:
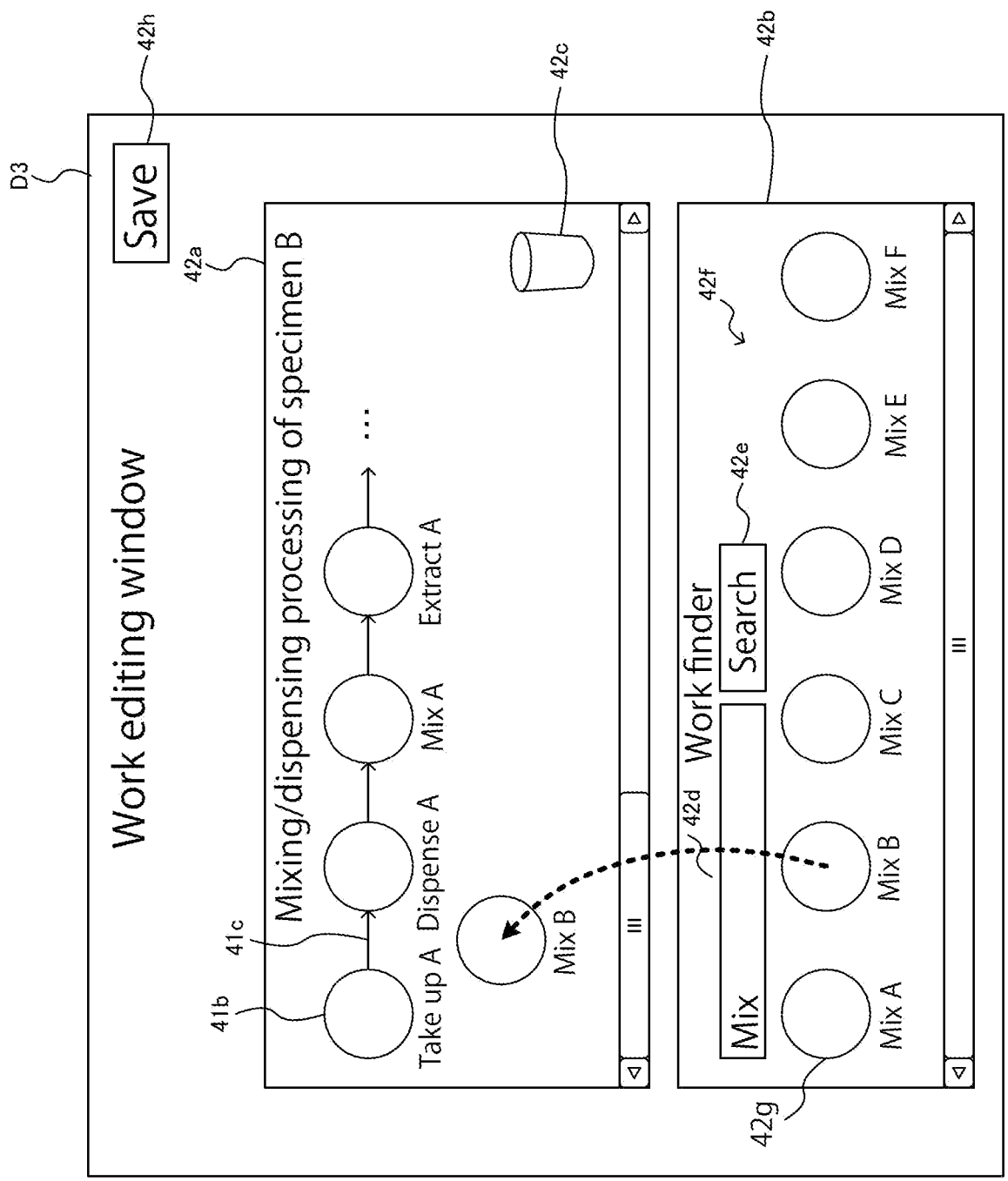
FIG. 11 illustrates another exemplary processing selection window.
Figure 12:
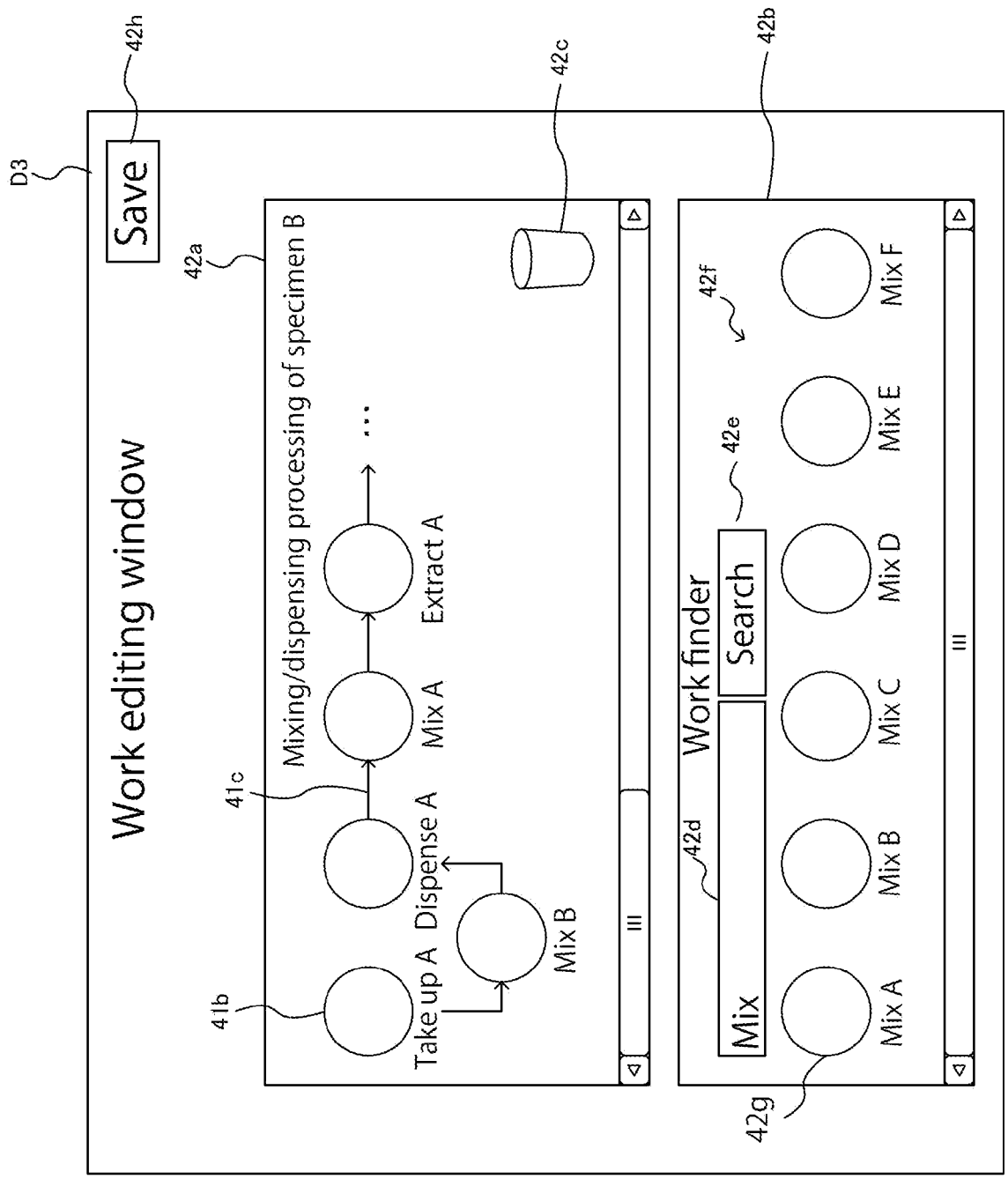
FIG. 12 illustrates another exemplary processing selection window.

In response to information input from the input device 203 with the work editing window D3 open, the work editing section 2043 performs an editing operation including: having other pieces of work unit job data replace the plurality of pieces of work unit job data included in the one piece of teaching data that corresponds to the one button 40d that has been selected in the selection operation in the processing selection window D1; and changing the order in which the corresponding pieces of work are executed. Specifically, in response to the information input from the input device 203 with the work editing window D3 open, the work editing section 2043 performs an editing operation including replacing the plurality of icons 41b displayed in the processing configuration display area 42a with the icons 42g displayed in the search result display area 42f, and changing the arrangement of the plurality of icons 41b. More specifically, as shown in FIG. 9, the work editing section 2043 is capable of performing an editing operation of dropping an icon 41b into the Recycle Bin icon 42c, thereby deleting the icon 41b from the processing configuration display area 42a. As shown in FIGS. 10 and 11, the work editing section 2043 is also capable of performing an editing operation of adding an icon 42g into the processing configuration display area 42a. As shown in FIG. 12, the work editing section 2043 is also capable of performing an editing operation of changing the form in which the icons 41b are coupled to each other by the arrows 41c. Then, when the "Save" button 42h in the work editing window D3 is handled, the editing content associated with the work editing section 2043 is stored.

When the one piece of work unit job data that corresponds to the icon 41b that has been selected in the selection operation in the processing configuration window D2 is a job data complex, then the work configuration window display section 2044 causes the display device 202 to display a work configuration window D4 (see FIG. 13, described below).

Figure 13:
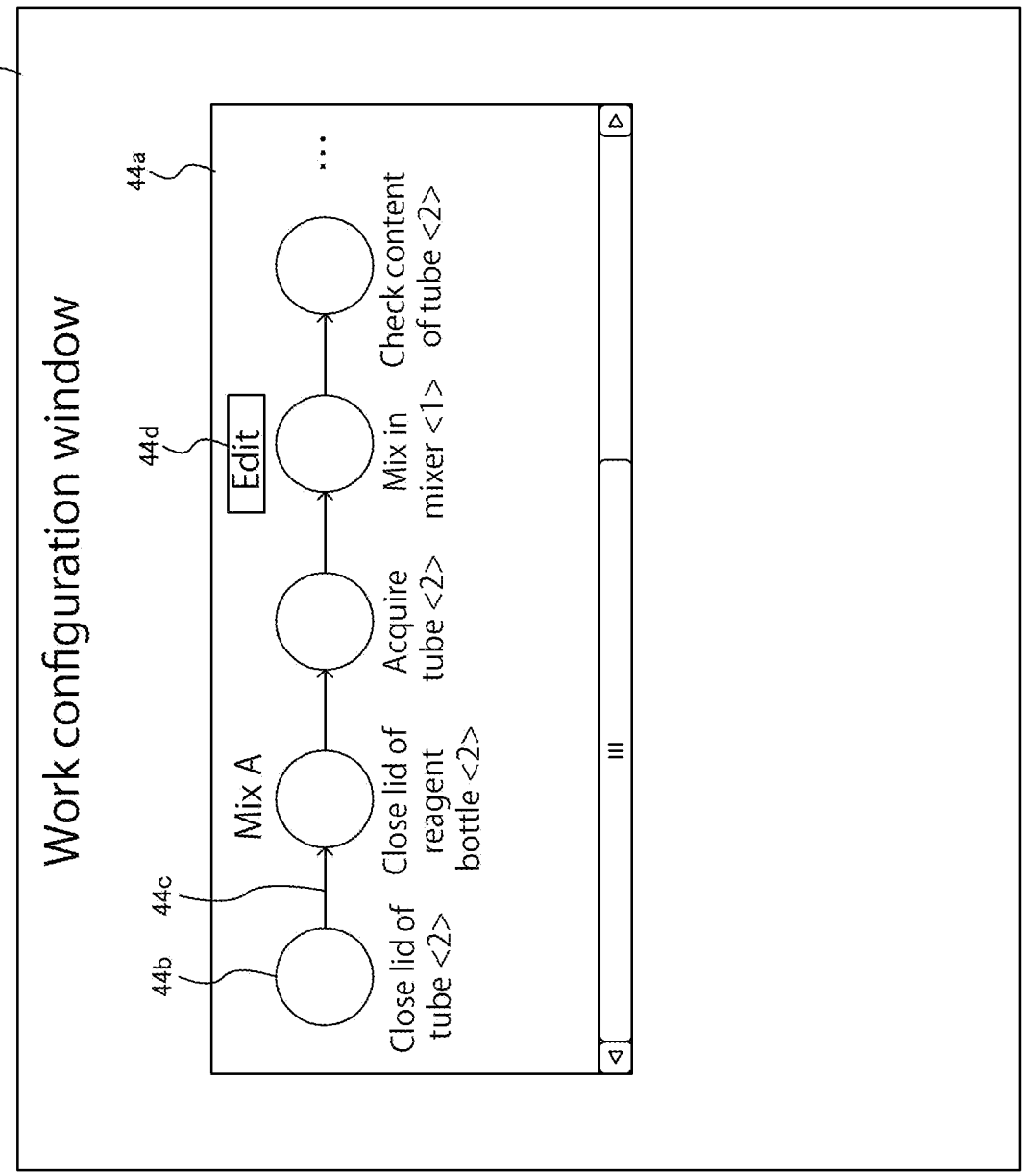
FIG. 13 illustrates an exemplary work editing window.

As shown in FIG. 13, the work configuration window D4 includes a work configuration display area 44a. The work configuration display area 44a displays a plurality of icons 44b (which correspond to the second images), a plurality of arrows 44c (which correspond to the coupling identifiers), and an "Edit" button 44d.

The plurality of icons 44b respectively indicate some pieces of job data that are among the plurality of pieces of job data stored in the storage device 201 and that are included in the one job data complex that corresponds to the one icon 41b that has been selected in the selection operation in the processing configuration window D2. The plurality of arrows 44c couple the plurality of icons 44b to each other in an order in which jobs respectively corresponding to the some pieces of job data are executed. That is, the plurality of icons 44b are coupled to each other by the plurality of arrows 44c and thus are arranged in the order in which the jobs respectively corresponding to the some pieces of job data are executed. In the example shown in FIG. 13, a "Close lid of tube <2>" icon 44b, a "Close lid of reagent bottle <2>" icon 44b, an "Acquire tube <2>" icon 44b, a "Mix in mixer <1>" icon 44b, a "Check content of tube <2>" icon 44b, and other icons 44b are coupled to each other by the arrows 44c in the order in which the jobs respectively corresponding to the some pieces of job data are executed. In this manner, the icons 44b are arranged in the order in which the jobs respectively corresponding to the some pieces of job data are executed. The operator, by performing an input operation with respect to the input device 203, performs a selection operation with respect to an icon 44b, among the plurality of icons 44b displayed in the work configuration display area 44a, that indicates the desired piece of job data. In this manner, the operator can select the job data.

The "Edit" button 44d is a form to perform an editing operation with respect to a plurality of pieces of job data included in the one job data complex that corresponds to the one icon 41b that has been selected in the selection operation in the processing configuration window D2. The operator can handle the "Edit" button 44d by performing an input operation with respect to the input device 203.

When the "Edit" button 44d in the work configuration window D4 is handled, the job editing window display section 2045 causes the display device 202 to display a job editing window D5 (see FIG. 14, described below).

Figure 14:
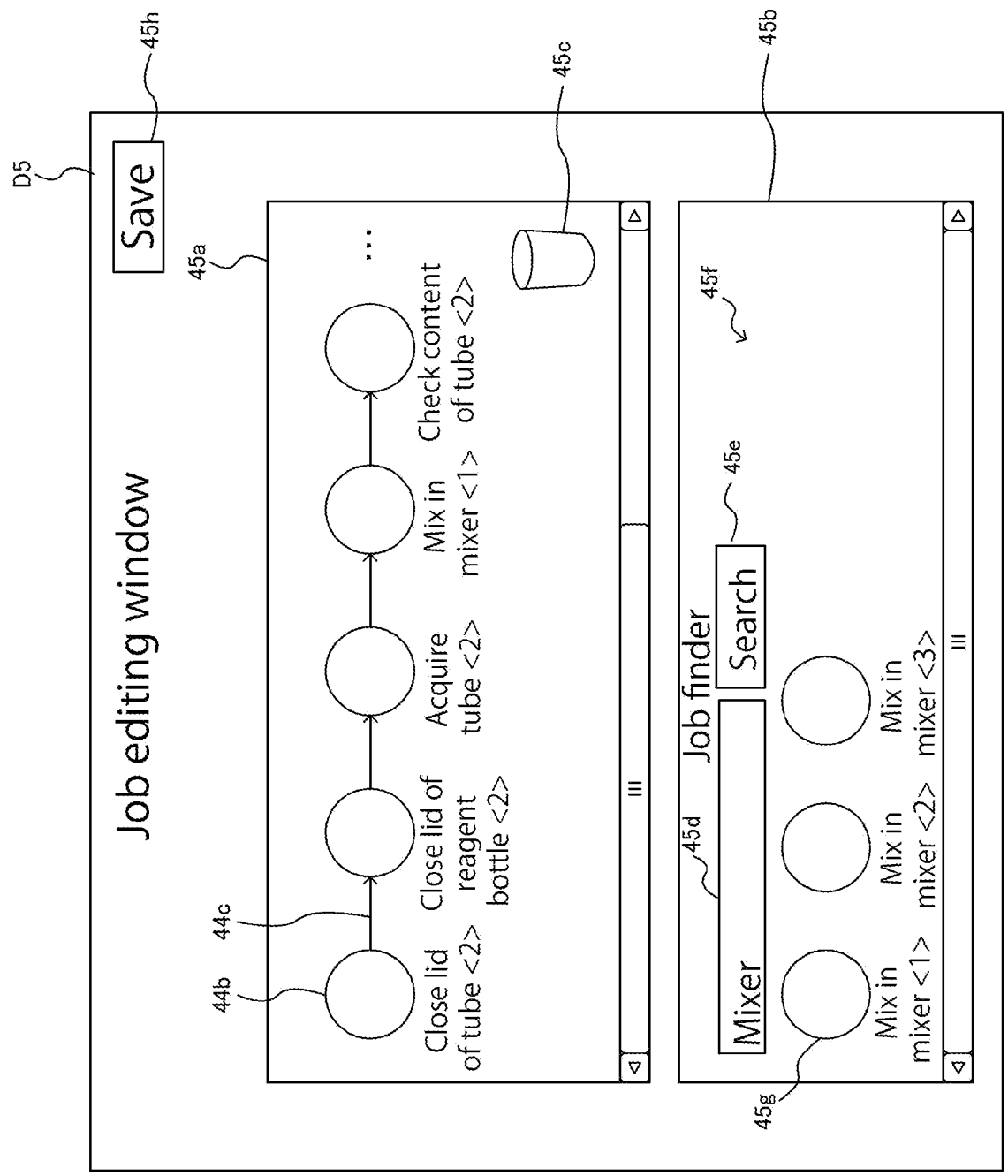
FIG. 14 illustrates an exemplary job editing window.

As shown in FIG. 14, the job editing window D5 includes a work configuration display area 45a, a replacing job display area 45b, and a "Save" button 45h.

The work configuration display area 45a displays a similar content to the display content of the work configuration display area 44a in the work configuration window D4, and also displays a Recycle Bin icon 45c.

The replacing job display area 45b displays a search input box 45d, a "Search" button 45e, and a search result display area 45f.

The search input box 45d is a form into which search target information (for example, title) associated with a desired piece of job data can be input by an input operation with respect to the input device 203. In the example shown in FIG. 14, "mixer" is input in the search input box 45d.

The "Search" button 45e is a form to start a search based on the input content of the search input box 45d. The operator can handle the "Search" button 45e by performing an input operation with respect to the input device 203.

The search result display area 45f is an area that displays the result of the above-described search. The search result display area 45f lists icons 45g (which correspond to the fourth images) indicating hits of job data (including other pieces of job data than the pieces of job data corresponding to the icons 44b displayed in the work configuration display area 45a) that the search has returned among the plurality of pieces of job data stored in the storage device 201. In the example shown in FIG. 14, the search result display area 45f lists a "Mix in mixer <1>" icon 45g, a "Mix in mixer <2>" icon 45g, and a "Mix in mixer <3>" icon 45g.

It is noted that the work configuration window D4 and the job editing window D5 correspond to the second window, and the job editing window D4 also corresponds to the first job selection window.

In response to the information input from the input device 203, the job editing section 2046 performs an editing operation including: having other pieces of job data replace the plurality of pieces of job data included in the one job data complex that corresponds to the one icon 41b that has been selected in the selection operation in the work editing window D3 with the job editing window D5 open; and changing the order in which the jobs respectively corresponding to the plurality of pieces of job data are executed. Specifically, in response to the information input from the input device 203 with the job editing window D5 open, the job editing section 2046 performs an editing operation including replacing the plurality of icons 44b displayed in the work configuration display area 45a with the icons 45g displayed in the search result display area 45f, and changing the arrangement of the plurality of icons 44b. More specifically, the job editing section 2046 is capable of performing an editing operation of dropping an icon 44b into the Recycle Bin icon 45c, thereby deleting the icon 44b from the work configuration display area 45a. The job editing section 2046 is also capable of performing an editing operation of adding an icon 45g into the work configuration display area 45a. The job editing section 2046 is also capable of performing an editing operation of changing the form in which the icons 44b are coupled to each other by the arrows 44c. Then, when the "Save" button 45h in the job editing window D5 is handled, the editing content associated with the job editing section 2046 is stored.

When one icon 44b is selected in a selection operation in the work configuration window D4 and thus one piece of job data is selected, then the parameter editing window display section 2047 causes the display device 202 to display a parameter editing window D6 (see FIG. 15, described below).

Figure 15:
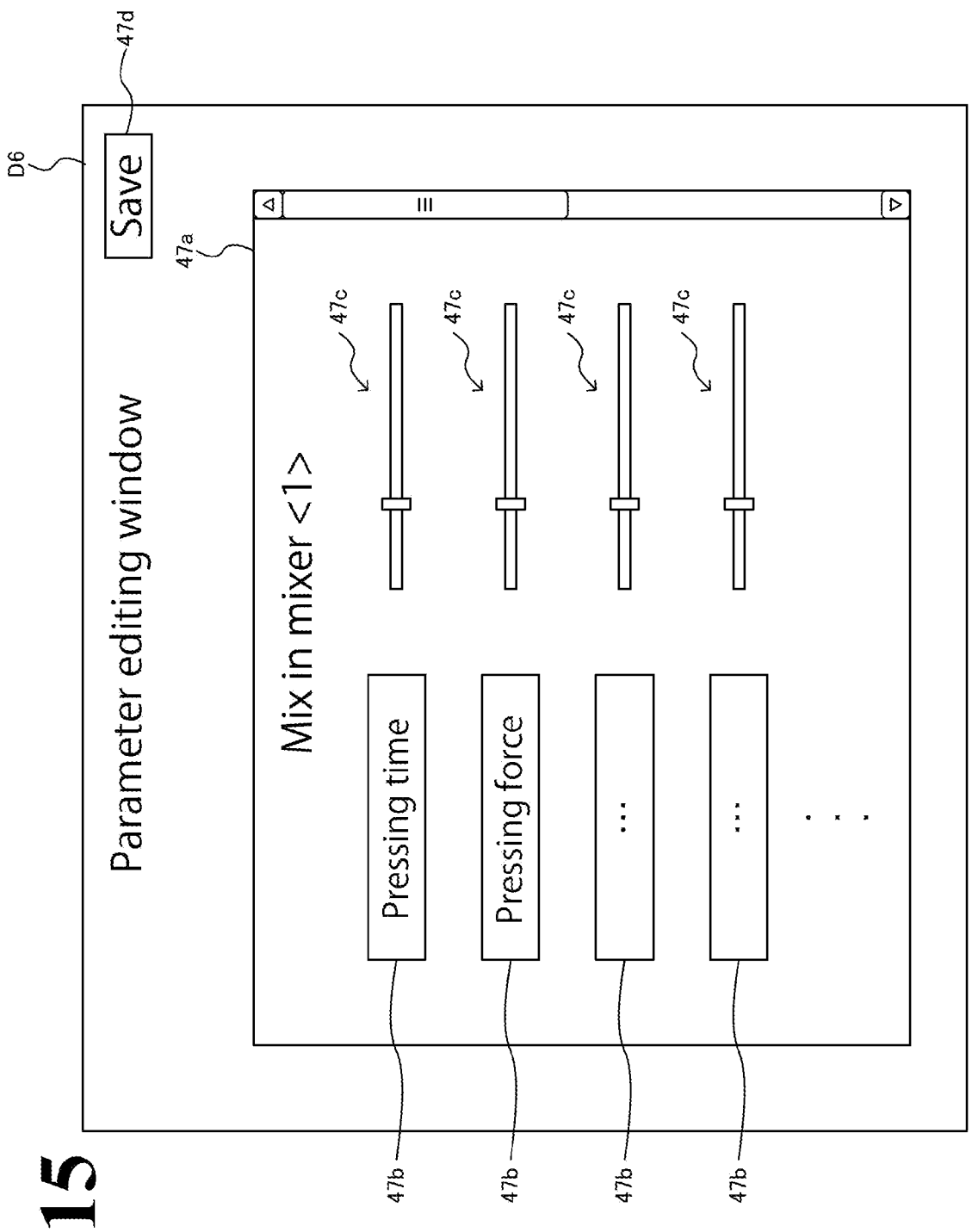
FIG. 15 illustrates an exemplary parameter editing window.

As shown in FIG. 15, the parameter editing window D6 (parameter display window) includes a parameter display area 47a and a "Save" button 47d.

The parameter display area 47a is an area that displays parameter information related to the one piece of job data that corresponds to the one icon 44b that has been selected in the selection operation in the job editing window D5. The parameter display area 47a lists: identifiers 47b (for example, titles) for one or more motion parameters associated with the corresponding one piece of job data indicated by the parameter information; and adjusters 47c to adjust the one or more motion parameters. The example shown in FIG. 15 is a list of motion parameters associated with the one piece of job data ("Mix in mixer <1>"), including: an identifier 47b indicating the time of pressing against the mixer 408 ("Pressing time") and a corresponding adjuster 47c; and an identifier 47b indicating the force of pressing against the mixer 408 ("Pressing force") and a corresponding adjuster 47c. The operator can handle the adjusters 47c by performing an input operation with respect to the input device 203.

In response to information input from the input device 203 with the parameter editing window D6 open, the parameter editing section 2048 performs an editing operation with respect to the parameter information displayed in the parameter editing window D6. Specifically, in response to the information input from the input device 203 with the parameter editing window D6 open, the parameter editing section 2048 handles a displayed adjuster 47c to adjust the corresponding motion parameter, thus performing the editing operation with respect to the parameter information. Then, when the "Save" button 47d in the parameter editing window D6 is handled, the editing content associated with the parameter editing section 2048 is stored.

The teaching data generation section 2049 generates teaching data based on the display content of the processing configuration display area 42a in the work editing window D3 that has been changed in accordance with the editing operation performed by the work editing section 2043. Specifically, the teaching data generation section 2049 generates teaching data that is made up of a plurality of pieces of work unit job data represented by the icons 41b and 42g and the arrows 41c that have been edited by the work editing section 2043 in the processing configuration display area 42a. Also the teaching data generation section 2049 generates teaching data based on the display content of the processing configuration display area 45a in the job editing window D5 that has been changed in accordance with the editing operation performed by the job editing section 2046. Specifically, the teaching data generation section 2049 generates work unit job data (job data complex) that is made up of a combination of a plurality of pieces of job data represented by the icons 44b and 45g and the arrows 44c that have been edited by the job editing section 2046 in the processing configuration display area 45a. Also the teaching data generation section 2049 generates teaching data based on the display content of the parameter display area 47a in the parameter editing window D6 that has been changed in accordance with the editing operation performed by the parameter editing section 2048. Specifically, the teaching data generation section 2049 generates parameter information that indicates the motion parameters respectively corresponding to the states of the adjusters 47c that have been edited by the parameter editing section 2048 in the parameter editing window D6.

Next, description will be made with regard to an exemplary control procedure of a method for generating teaching data executed by the arithmetic device 204 of the PC 200.

Figure 16:
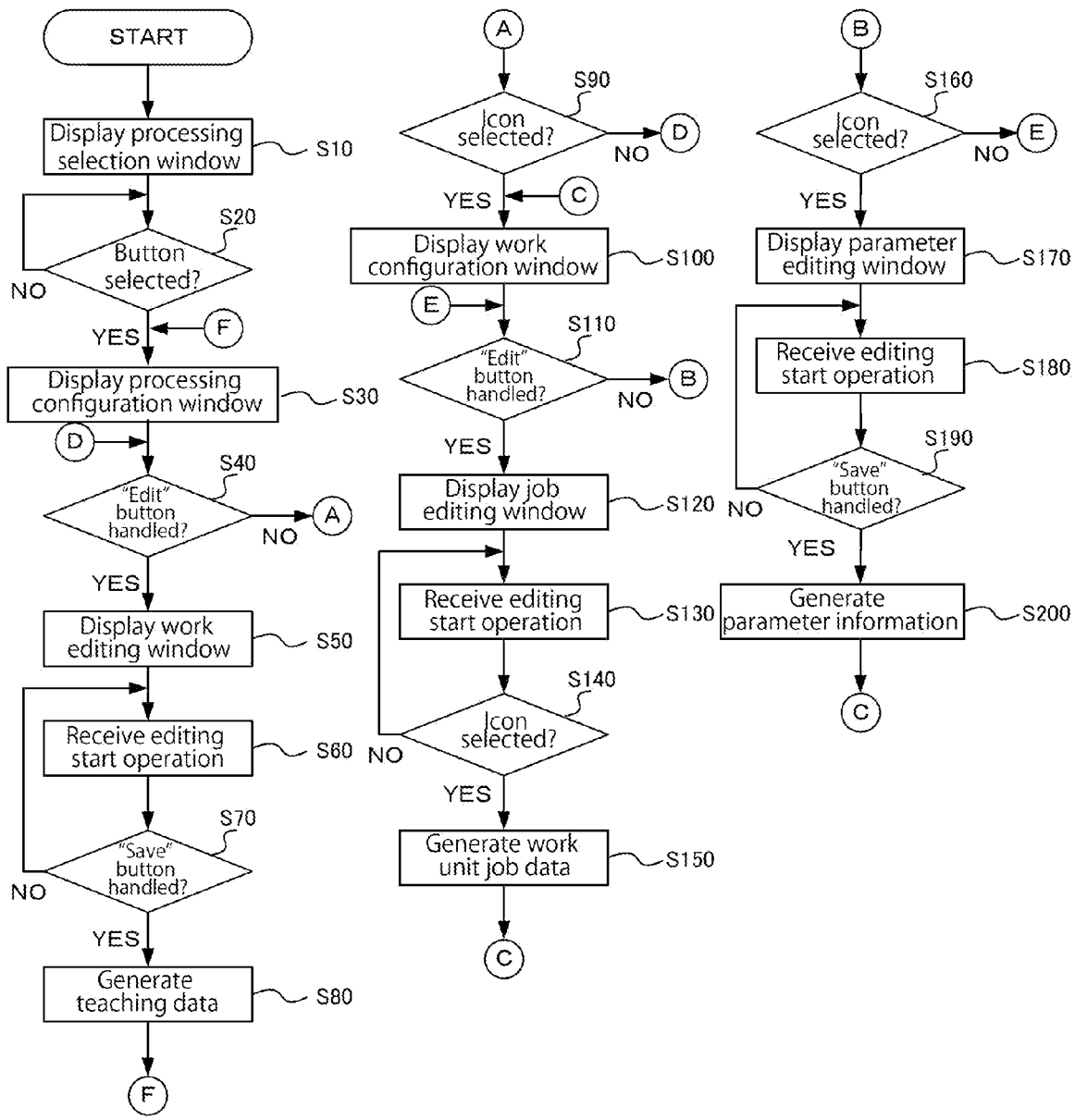
FIG. 16 is a flowchart of an exemplary control procedure of a method for generating teaching data executed by the arithmetic device of the PC.

As shown in FIG. 16, when a predetermined operation is performed by an input operation with respect to the input device 203, then at step S10 the arithmetic device 204 has its processing selection window display section 2040 cause the display device 202 to display the processing selection window D1.

Then, at step S20, the arithmetic device 204 determines whether one button 40d has been selected in a selection operation in the processing selection window D1. The determination at step S20 stays in the negative until one button 40d is selected in a selection operation, while the process keeps a loop of waiting state. When one button 40d is selected in a selection operation, the determination at step S20 is in the affirmative, and the process proceeds to step S30.

At step S30, the arithmetic device 204 has its processing configuration window display section 2041 cause the display device 202 to display the processing configuration window D2.

Then, at step S40, the arithmetic device 204 determines whether the "Edit" button 41d in the processing configuration window D2 has been handled. When the "Edit" button 41d is handled, the determination at step S40 is in the affirmative, and the process proceeds to step S50.

At step S50, the arithmetic device 204 has its work editing window display section 2042 cause the display device 202 to display the work editing window D3.

Then, at step S60, in response to information input from the input device 203 with the work editing window D3 open, the arithmetic device 204 has its work editing section 2043 perform an editing operation including replacing the plurality of icons 41b displayed in the processing configuration display area 42a with the icons 42g displayed in the search result display area 42f, and changing the arrangement of the plurality of icons 41b.

Then, at step S70, the arithmetic device 204 determines whether the "Save" button 42h in the work editing window D3 has been handled. The determination at step S70 stays in the negative until the "Save" button 42h is handled, while the process returns to step S60 to repeat a similar procedure. When the "Save" button 42h is handled, the determination at step S70 is in the affirmative, and the editing content associated with the work editing section 2043 at step S60 is stored. Then, the process proceeds to step S80.

At step S80, the arithmetic device 204 has its teaching data generation section 2049 generate teaching data that is made up of a combination of a plurality of pieces of work unit job data represented by the icons 41b and 42g and the arrows 41c that have been edited by the work editing section 2043 at step S60 in the work editing window D3 of the processing configuration display area 42a. Then, the process returns to step S30 to repeat a similar procedure. When the process returns to step S30, the display device 202 displays the processing configuration window D2 with a content based on the teaching data generated at step S80.

When at step S40 the "Edit" button 41d is not handled, the determination at step S40 is in the negative, and the process proceeds to step S90.

At step S90, the arithmetic device 204 determines whether one icon 41b indicating the job data complex has been selected in a selection operation in the processing configuration window D2. When no one icon 41b indicating a job data complex is selected in a selection operation, the determination at step S90 is in the negative, and the process returns to step S40 to repeat a similar procedure. When one icon 41b indicating a job data complex is selected in a selection operation, the determination at step S90 is in the affirmative, and the process proceeds to step S100.

At step S100, the arithmetic device 204 has its work configuration window display section 2044 cause the display device 202 to display the work configuration window D4.

Then, at step S110, the arithmetic device 204 determines whether the "Edit" button 44d has been handled in the work configuration window D4. When the "Edit" button 44d is handled, the determination at step S110 is in the affirmative, and the process proceeds to step S120.

At step S120, the arithmetic device 204 has its job editing window display section 2045 cause the display device 202 to display the job editing window D5.

Then, at step S130, in response to the information input from the input device 203 with the job editing window D5 open, the arithmetic device 204 has its job editing section 2046 perform an editing operation including replacing the plurality of icons 44b displayed in the work configuration display area 45a with the icons 45g displayed in the search result display area 45f, and changing the arrangement of the plurality of icons 44b.

Then, at step S140, the arithmetic device 204 determines whether the "Save" button 45h has been handled in the job editing window D5. The determination at step S140 stays in the negative until the "Save" button 45h is handled, while the process returns to step S130 to repeat a similar procedure. When the "Save" button 45h is handled, the determination at step S140 is in the affirmative, and the editing content associated with the job editing section 2046 at step S130 is stored. Then, the process proceeds to step S150.

At step S150, the arithmetic device 204 has its teaching data generation section 2049 generate work unit job data (job data complex) that is made up of a combination of a plurality of pieces of job data represented by the icons 44b and 45g and the arrows 44c that have been edited by the job editing section 2046 at step S130 in the job editing window D5 of the work configuration display area 45a. Then, the process returns to step S100 to repeat a similar procedure. When the process returns to step S100, the display device 202 displays the work configuration window D4 with a content based on the work unit job data generated at step S150.

When at step S110 the "Edit" button 44d is not handled, the determination at step S110 is in the negative, and the process proceeds to step S160.

At step S160, the arithmetic device 204 determines whether one icon 44b has been selected in a selection operation in the work configuration window D4. When no one icon 44b has been selected in a selection operation, the determination at step S160 is in the negative, and the process returns to step S110 to repeat a similar procedure. When one icon 44b is selected in a selection operation, the determination at step S160 is in the affirmative, and the process proceeds to step S170.

At step S170, the arithmetic device 204 has its parameter editing window display section 2047 cause the display device 202 to display the parameter editing window D6.

Then, at step S180, in response to the information input from the input device 203 with the parameter editing window D6 open, the arithmetic device 204 has its parameter editing section 2048 handle a displayed adjuster 47c to adjust its corresponding motion parameter, thus performing an editing operation with respect to the parameter information.

Then, at step S190, the arithmetic device 204 determines whether the "Save" button 47h has been handled in the parameter editing window D6. The determination at step S190 stays in the negative until the "Save" button 47h is handled, while the process returns to step S180 to repeat a similar procedure. When the "Save" button 47h is handled, the determination at step S190 is in the affirmative, and the editing content associated with the parameter editing section 2048 at S180 is stored. Then, the process proceeds to step S200.

At step S200, the arithmetic device 204 has its teaching data generation section 2049 generate the motion parameters respectively corresponding to the states of the adjusters 47c that have been edited by the parameter editing section 2048 at step S180 in the parameter editing window D6. Then, the process returns to step S100 to repeat a similar procedure. It is noted that this flow of processing ends upon execution of a predetermined ending operation through an input operation with respect to the input device 203.

It is noted that the procedures at steps S30 and S50 correspond to the displaying step. The procedure at step S60 corresponds to the editing step. The procedure at step S80 corresponds to the generating step.

As has been described hereinbefore, in this embodiment, the display device 202 displays the processing configuration window D2 and the work editing window D3. The processing configuration window D2 and the work editing window D3 display the plurality of icons 41b indicating some pieces of work unit job data that are among the plurality of pieces of work unit job data stored in the storage device 201 and that are included in one piece of teaching data. The plurality of icons 41b are arranged in an order in which pieces of work respectively corresponding to the some pieces of work unit job data are executed. Then, in response to information input from the input device 203, the work editing section 2043 performs an editing operation including replacing the some pieces of the work unit job data respectively corresponding to the plurality of icons 41b with other pieces of the work unit job data stored in the storage device 201, and changing the order in which the pieces of work respectively corresponding to the some pieces of work unit job data are executed. Then, the teaching data generation section 2049 generates teaching data based on the display content of the processing configuration window display section 2041 that has been changed in accordance with the editing operation performed by the work editing section 2043.

Thus, in this embodiment, the operator, by performing an input operation with respect to the input device 203, can easily edit the plurality of pieces of work unit job data respectively corresponding to the plurality of icons 41b. This facilitates generation of teaching data that is based on this editing operation. As a result, even a person who lacks expertise and proficiency in teaching the robot 100 can easily generate or edit teaching data.

It is particularly noted that in this embodiment, when the operator selects job data displayed in the work configuration window D4 by performing an input operation with respect to the input device 203, then the parameter editing window D6 displays parameter information related to the selected job data. Then, the operator can easily edit the parameter information by performing an input operation with respect to the input device 203. This facilitates generation of teaching data that is based on this editing operation.

It is particularly noted that in this embodiment, when the operator, by performing an input operation with respect to the input device 203, selects a job data complex displayed in the processing configuration window D2, then the work configuration window D4 displays the plurality of icons 44b indicating a plurality of pieces of job data constituting the selected job data complex. Then, the operator, by performing an input operation with respect to the input device 203, can easily edit the plurality of pieces of job data respectively corresponding to the plurality of icons 44b. This facilitates generation of teaching data that is based on this editing operation.

It is particularly noted that in this embodiment, the operator can select an icon 41b in the processing configuration window D2 by performing an input operation with respect to the input device 203, select an icon 44b in the work configuration window D4 by performing an input operation with respect to the input device 203, and easily edit the parameter information in the parameter editing window D6 by performing an input operation with respect to the input device 203. This facilitates generation of teaching data that is based on this editing operation.

It is particularly noted that in this embodiment, the work editing window D3 includes the replacing work display area 42b. The replacing work display area 42b displays the icons 42g indicating other pieces of work unit job data available to replace the plurality of pieces of work unit job data respectively corresponding to the plurality of icons 41b. Then, in response to information input from the input device 203, the work editing section 2043 performs an editing operation including replacing the plurality of icons 41b with the icons 42g, and changing the arrangement of the plurality of icons 41b. This ensures that through the operator's input operation with respect to the input device 203, the operator can easily generate teaching data that has been edited by replacing any of the plurality of pieces of work unit job data with other pieces of work unit job data, or by changing the order in which the pieces of work respectively corresponding to the plurality of pieces of work unit job data are executed.

It is particularly noted that in this embodiment, the job editing window D5 includes the replacing job display area 45b. The replacing job display area 45b displays the icons 45g indicating other pieces of job data available to replace the plurality of pieces of job data respectively corresponding to the plurality of icons 44b. Then, in response to information input from the input device 203, the job editing section 2046 performs an editing operation including replacing the plurality of icons 44b with the icons 45g, and changing the arrangement of the plurality of icons 44b. This ensures that through the operator's input operation with respect to the input device 203, the operator can easily generate teaching data that has been edited by replacing any of the plurality of pieces of job data with other pieces of job data, or by changing the order in which the jobs respectively corresponding to the plurality of pieces of job data are executed.

It is particularly noted that in this embodiment, the display device 202 displays the processing configuration window D2 and the work editing window D3. The processing configuration window D2 and the work editing window D3 display the plurality of icons 41b with the plurality of arrows 41c coupling the plurality of icons 41b in an order in which the corresponding pieces of work are executed. Then, in response to information input from the input device 203, the work editing section 2043 performs an editing operation of changing the form in which the plurality of icons 41b are coupled to each other by the plurality of arrows 41c. This ensures that through the operator's input operation with respect to the input device 203, the operator can easily generate teaching data that has been edited by changing the order in which the plurality of pieces of work are executed or by changing how to branch the flow of the work.

It is particularly noted that in this embodiment, the display device 202 displays the work configuration window D4 and the job editing window D5. The work configuration window D4 and the job editing window D5 display the plurality of icons 44b with the plurality of arrows 44c coupling the plurality of icons 44b together in an order in which the corresponding jobs are executed. Then, in response to information input from the input device 203, the job editing section 2046 performs an editing operation of changing the form in which the plurality of icons 44b are coupled to each other by the plurality of arrows 44c. This ensures that through the operator's input operation with respect to the input device 203, the operator can easily generate teaching data that has been edited by changing the order in which the plurality of jobs are executed or by changing how to branch the flow of the jobs.

It is noted that this embodiment should not be construed in a limiting sense, and various modifications are possible without departing from the spirit and technical scope of the present disclosure. For example, in the above-described embodiment, a desired piece of work unit job data (icon 41b) is selectable in the processing configuration window D2. This, however, should not be construed in a limiting sense. The desired piece of work unit job data (icon 41b) may be selectable in the work editing window D3 instead of or in addition to the processing configuration window D2. In this case, the work editing window D3 corresponds to the second job selection window, and the work editing window display section 2042, which causes the display device 202 to display the work editing window D3, corresponds to the second job selection window display section.

Also in the above-described embodiment, a desired piece of job data (icon 44b) is selectable in the work configuration window D4. This, however, should not be construed in a limiting sense. The desired piece of job data (icon 44b) may be selectable in the job editing window D5 instead of or in addition to the work configuration window D4. In this case, the job editing window D5 corresponds to the first job selection window, and the job editing window display section 2045, which causes the display device 202 to display the job editing window D5, corresponds to the first job selection window display section.

Also in the above-described embodiment, the work editing window D3 includes the replacing work display area 42b. This, however, should not be construed in a limiting sense. Instead of or in addition to the work editing window D3, the processing configuration window D2 may include the replacing work display area. Also in the above-described embodiment, the job editing window D5 includes the replacing job display area 45b. This, however, should not be construed in a limiting sense. Instead of or in addition to the job editing window D5, the work configuration window D4 may include the replacing job display area.

Also in the above-described embodiment, the processing configuration window D2 and the work editing window D3 are displayed separately. This, however, should not be construed in a limiting sense. The processing configuration window D2 and the work editing window D3 may be displayed together. Also in the above-described embodiment, the work configuration window D4 and the job editing window D5 are displayed separately. This, however, should not be construed in a limiting sense. The work configuration window D4 and the job editing window D5 may be displayed together.

Also in the above-described embodiment, the motions that the robot 100 is able to take are in a three-hierarchical form of processing, work, and job (or in a two-hierarchical form of processing and work). This, however, should not be construed in a limiting sense. The motions that the robot 100 is able to take may be in a four-hierarchical form (in which, for example, a job may be made up of a plurality of sub jobs (predetermined motions)), or may be in a greater hierarchical form.

Also in the above-described embodiment, the exemplary teaching data to be generated or edited is related to the robot 100, which is capable of performing a plurality of kinds of processing with respect to a specimen. This, however, should not be construed in a limiting sense. It is also possible to generate or edit teaching data related to various robots.

The arrows shown FIGS. 3 and 5 indicate exemplary flows of signals and are not intended to limit the directions of the flows of the signals.

The flowchart shown in FIG. 16 is not intended to limit the control details to the procedures shown therein. It is also possible to add a procedure, delete any of the procedures, or change the order of the procedures without departing from the spirit and technical scope of the present disclosure.

Otherwise, the above-described embodiment and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system comprising:
a robot;
a teaching data generator comprising:
    a storage device configured to store at least one piece of teaching data to be generated or edited to specify a motion form of a robot;
    a display device configured to present a predetermined display based on the at least one piece of teaching data stored in the storage device and a plurality of pieces of work unit job data stored in the storage device, each piece of work unit job data specifying a motion form of the robot, the plurality of pieces of work unit job data each comprising at least one of a plurality of pieces of job data, the plurality of pieces of job data each specifying a predetermined motion of the robot and being applicable as a part of the at least one piece of teaching data;
    an input device through which information is input;
    an arithmetic device configured to control an operation of the storage device and an operation of the display device, and configured to receive the information input from the input device, the arithmetic device comprising:
        a first window display section configured to cause the display device to display a first window displaying a plurality of first images respectively corresponding to some pieces of the work unit job data of the pieces of work unit job data stored in the storage device and that are included in the at least one piece of teaching data, the plurality of first images being arranged in an order in which pieces of work respectively corresponding to the some pieces of the work unit job data are executed;
        a second window display section configured to cause the display device to display a second window displaying a plurality of second images respectively corresponding to the some pieces of the job data constituting a selected job data complex having a combination of some pieces of the job data;
        a first job selection window display section configured to cause the display device to display a first job selection window in which a desired piece of job data is selectable among the plurality of pieces of job data;
        a second job selection window display section configured to cause the display device to display a second job selection window in which a desired piece of work unit job data is selectable among the plurality of pieces of work unit job data;
        a first job editing section configured to, in response to the information input from the input device, perform an editing operation comprising replacing the some pieces of the work unit job data respectively corresponding to the plurality of first images with other pieces of the work unit job data stored in the storage device, and changing the order in which the pieces of work respectively corresponding to the some pieces of the work unit job data are executed; and
        a teaching data generation section configured to generate the at least one piece of teaching data based on a displayed content of the first window that has been changed in accordance with the editing operation performed by the first job editing section; and
a robot controller configured to control the robot to move based on the piece of teaching data generated or edited by the teaching data generator; and
wherein at least one of the first window and the second job selection window comprises a replacing work display area displaying third images respectively corresponding to the other pieces of the work unit job data available to replace the plurality of first images respectively corresponding to the some pieces of the work unit job data, or
wherein at least one of the second window and the first job selection window comprises a replacing work display area displaying fourth images respectively corresponding to other pieces of the job data available to replace the plurality of pieces of job data respectively corresponding to the plurality of second images.

2. The robot system according to claim 1,
wherein the storage device is configured to store the plurality of pieces of job data in relation to pieces of parameter information that are related to predetermined motions of the robot specified by the respective, corresponding pieces of job data, wherein the arithmetic device comprises
- a parameter display window display section configured to cause the display device to display a parameter display window displaying a piece of parameter information among the pieces of parameter information that is related to the desired piece of job data selected in the first job selection window in response to the information input from the input device, and
- a parameter editing section configured to, in response to the information input from the input device, perform an editing operation with respect to the piece of parameter information displayed in the parameter display window, and wherein the teaching data generation section is configured to generate the at least one piece of teaching data based on a display content of the parameter display window that has been changed in accordance with the editing operation performed by the parameter editing section.

3. The robot system according to claim 2,
wherein at least one piece of work unit job data among the plurality of pieces of work unit job data comprises the job data complex comprising the combination of some pieces of the job data, wherein the second window display section is configured to, when the desired piece of work unit job data selected in the second job selection window in response to the information input from the input device is the job data complex, cause the display device to display the second window displaying the plurality of second images respectively corresponding to the some pieces of the job data constituting the selected job data complex, the plurality of second images being arranged in an order in which jobs respectively corresponding to the some pieces of the job data are executed, and wherein the arithmetic device comprises a second job editing section configured to, in response to the information input from the input device, perform an editing operation comprising replacing the some pieces of the job data respectively corresponding to the plurality of second images with the other pieces of the job data stored in the storage device, and changing the order in which the jobs respectively corresponding to the some pieces of the job data are executed, and wherein the teaching data generation section is configured to generate the at least one piece of teaching data based on a display content of the second window that has been changed in accordance with the editing operation performed by the second job editing section.

4. The teaching data generator according to claim 3,
wherein based on control of at least one of the first window display section and the second job selection window display section, the display device is configured to display, in at least one of the first window and the second job selection window, the plurality of first images respectively corresponding to the some pieces of the work unit job data included in the at least one piece of teaching data selected in response to the information input from the input device, wherein when one first image among the plurality of first images is selected in at least one of the first window and the second job selection window in response to the information input from the input device, and when the selected first image is a first image corresponding to the job data complex, then based on control of at least one of the second window display section and the first job selection window display section, the display device is configured to display, in at least one of the second window and the first job selection window, the plurality of second images respectively corresponding to the some pieces of the job data constituting the job data complex corresponding to the selected one first image, and wherein when one second image among the plurality of second images is selected in at least one of the second window and the first job selection window in response to the information input from the input device, then the display device is configured to, based on control of the parameter display window display section, display in the parameter display window a piece of the parameter information that corresponds to a piece of the job data that corresponds to the piece of parameter information.

5. A robot system comprising:
a robot;
a teaching data generator comprising:
- a storage device configured to store at least one piece of teaching data to be generated or edited to specify a motion form of a robot;
- a display device configured to present a predetermined display based on the at least one piece of teaching data stored in the storage device and a plurality of pieces of work unit job data stored in the storage device, each piece of work unit job data specifying a motion form of the robot, the plurality of pieces of work unit job data each comprising at least one of a plurality of pieces of job data, the plurality of pieces of job data each specifying a predetermined motion of the robot and being applicable as a part of the at least one piece of teaching data;
- an input device through which information is input;
- an arithmetic device configured to control an operation of the storage device and an operation of the display device, and configured to receive the information input from the input device, the arithmetic device comprising:
  - a first window display section configured to cause the display device to display a first window displaying a plurality of first images respectively corresponding to some pieces of the work unit job data of the pieces of work unit job data stored in the storage device and that are included in the at least one piece of teaching data, the plurality of first images being arranged in an order in which pieces of work respectively corresponding to the some pieces of the work unit job data are executed; and
a robot controller configured to control the robot to move based on the piece of teaching data generated or edited by the teaching data generator,
wherein the storage device is configured to store the plurality of pieces of job data in relation to pieces of parameter information that are related to predetermined motions of the robot specified by the respective, corresponding pieces of job data,
wherein the arithmetic device further comprises
- a first job selection window display section configured to cause the display device to display a first job selection window in which a desired piece of job data is selectable among the plurality of pieces of job data stored in the storage device,
- a parameter display window display section configured to cause the display device to display a parameter display window displaying a piece of parameter information among the pieces of parameter information that is related to the desired piece of job data selected in the first job selection window in response to the information input from the input device, and a parameter editing section configured to, in response to the information input from the input device, perform an editing operation with respect to the piece of parameter information displayed in the parameter display window, wherein the teaching data generation section is configured to generate the at least one piece of teaching data based on a display content of the parameter display window that has been changed in accordance with the editing operation performed by the parameter editing section, wherein at least one piece of work unit job data among the plurality of pieces of work unit job data comprises a job data complex comprising a combination of some pieces of the job data, wherein the arithmetic device further comprises a second job selection window display section configured to cause the display device to display a second job selection window in which a desired piece of work unit job data is selectable among the plurality of pieces of work unit job data stored in the storage device, a second window display section configured to, when the desired piece of work unit job data selected in the second job selection window in response to the information input from the input device is the job data complex, cause the display device to display a second window displaying a plurality of second images respectively corresponding to the some pieces of the job data constituting the selected job data complex, the plurality of second images being arranged in an order in which jobs respectively corresponding to the some pieces of the job data are executed, and a second job editing section configured to, in response to the information input from the input device, perform an editing operation comprising replacing the some pieces of the job data respectively corresponding to the plurality of second images with other pieces of the job data stored in the storage device, and changing the order in which the jobs respectively corresponding to the some pieces of the job data are executed, wherein the teaching data generation section is configured to generate the at least one piece of teaching data based on a display content of the second window that has been changed in accordance with the editing operation performed by the second job editing section, wherein based on control of at least one of the first window display section and the second job selection window display section, the display device is configured to display, in at least one of the first window and the second job selection window, the plurality of first images respectively corresponding to the some pieces of the work unit job data included in the at least one piece of teaching data selected in response to the information input from the input device, wherein when one first image among the plurality of first images is selected in at least one of the first window and the second job selection window in response to the information input from the input device, and when the selected first image is a first image corresponding to the job data complex, then based on control of at least one of the second window display section and the first job selection window display section, the display device is configured to display, in at least one of the second window and the first job selection window, the plurality of second images respectively corresponding to the some pieces of the job data constituting the job data complex corresponding to the selected one first image, wherein when one second image among the plurality of second images is selected in at least one of the second window and the first job selection window in response to the information input from the input device, then the display device is configured to, based on control of the parameter display window display section, display in the parameter display window a piece of the parameter information that corresponds to a piece of the job data that corresponds to the piece of parameter information, wherein at least one of the first window and the second job selection window comprises a replacing work display area displaying third images respectively corresponding to the other pieces of the work unit job data available to replace the plurality of first images respectively corresponding to the some pieces of the work unit job data, and wherein in response to the information input from the input device, the first job editing section is configured to perform an editing operation comprising replacing the plurality of first images with the third images, and changing an arrangement of the plurality of first images.

6. A robot system comprising:

a robot;

a teaching data generator comprising:

a storage device configured to store at least one piece of teaching data to be generated or edited to specify a motion form of a robot;

a display device configured to present a predetermined display based on the at least one piece of teaching data stored in the storage device and a plurality of pieces of work unit job data stored in the storage device, each piece of work unit job data specifying a motion form of the robot, the plurality of pieces of work unit job data each comprising at least one of a plurality of pieces of job data, the plurality of pieces of job data each specifying a predetermined motion of the robot and being applicable as a part of the at least one piece of teaching data;

an input device through which information is input; and an arithmetic device configured to control an operation of the storage device and an operation of the display device, and configured to receive the information input from the input device, the arithmetic device comprising:

a first window display section configured to cause the display device to display a first window displaying a plurality of first images respectively corresponding to some pieces of the work unit job data of the pieces of work unit job data stored in the storage device and that are included in the at least one piece of teaching data, the plurality of first images being arranged in an order in which pieces of work respectively corresponding to the some pieces of the work unit job data are executed; and a robot controller configured to control the robot to move based on the piece of teaching data generated or edited by the teaching data generator, wherein the storage device is configured to store the plurality of pieces of job data in relation to pieces of parameter information that are related to predetermined motions of the robot specified by the respective, corresponding pieces of job data, wherein the arithmetic device further comprises a first job selection window display section configured to cause the display device to display a first job selection window in which a desired piece of job data is selectable among the plurality of pieces of job data stored in the storage device, a parameter display window display section configured to cause the display device to display a parameter display window displaying a piece of parameter information among the pieces of parameter information that is related to the desired piece of job data selected in the first job selection window in response to the information input from the input device, and a parameter editing section configured to, in response to the information input from the input device, perform an editing operation with respect to the piece of parameter information displayed in the parameter display window, wherein the teaching data generation section is configured to generate the at least one piece of teaching data based on a display content of the parameter display window that has been changed in accordance with the editing operation performed by the parameter editing section, wherein at least one piece of work unit job data among the plurality of pieces of work unit job data comprises a job data complex comprising a combination of some pieces of the job data, wherein the arithmetic device further comprises a second job selection window display section configured to cause the display device to display a second job selection window in which a desired piece of work unit job data is selectable among the plurality of pieces of work unit job data stored in the storage device, a second window display section configured to, when the desired piece of work unit job data selected in the second job selection window in response to the information input from the input device is the job data complex, cause the display device to display a second window displaying a plurality of second images respectively corresponding to the some pieces of the job data constituting the selected job data complex, the plurality of second images being arranged in an order in which jobs respectively corresponding to the some pieces of the job data are executed, and a second job editing section configured to, in response to the information input from the input device, perform an editing operation comprising replacing the some pieces of the job data respectively corresponding to the plurality of second images with other pieces of the job data stored in the storage device, and changing the order in which the jobs respectively corresponding to the some pieces of the job data are executed, wherein the teaching data generation section is configured to generate the at least one piece of teaching data based on a display content of the second window that has been changed in accordance with the editing operation performed by the second job editing section, wherein based on control of at least one of the first window display section and the second job selection window display section, the display device is configured to display, in at least one of the first window and the second job selection window, the plurality of first images respectively corresponding to the some pieces of the work unit job data included in the at least one piece of teaching data selected in response to the information input from the input device, wherein when one first image among the plurality of first images is selected in at least one of the first window and the second job selection window in response to the information input from the input device, and when the selected first image is a first image corresponding to the job data complex, then based on control of at least one of the second window display section and the first job selection window display section, the display device is configured to display, in at least one of the second window and the first job selection window, the plurality of second images respectively corresponding to the some pieces of the job data constituting the job data complex corresponding to the selected one first image, wherein when one second image among the plurality of second images is selected in at least one of the second window and the first job selection window in response to the information input from the input device, then the display device is configured to, based on control of the parameter display window display section, display in the parameter display window a piece of the parameter information that corresponds to a piece of the job data that corresponds to the piece of parameter information, wherein at least one of the second window and the first job selection window comprises a replacing job display area displaying fourth images respectively corresponding to other pieces of the job data available to replace the plurality of pieces of job data respectively corresponding to the plurality of second images, and wherein in response to the information input from the input device, the second job editing section is configured to perform an editing operation comprising replacing the plurality of second images with the fourth images, and changing an arrangement of the plurality of second images.

7. The teaching data generator according to claim 4, wherein based on control of at least one of the first window display section and the second job selection window display section, the display device is configured to couple the plurality of first images to each other using a plurality of coupling identifiers corresponding to the order in which the pieces of work respectively corresponding to the some pieces of the work unit job data are executed, and configured to display the coupled first images in at least one of the first window and the second job selection window, and wherein in response to the information input from the input device, the first job editing section is configured to perform an editing operation of changing a form in which the plurality of first images are coupled to each other by the plurality of coupling identifiers.

8. The teaching data generator according to claim 4, wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

9. The robot system according to claim 1, wherein the teaching data generator is configured to generate or edit the piece of teaching data that specifies a motion form of the robot.

10. A method for generating teaching data generated or edited to specify a motion form of a robot and controlling the robot, the method comprising:

displaying, on a first window of a display device, a plurality of images respectively corresponding to some pieces of work unit job data that are among a plurality of pieces of stored work unit job data and that are included in at least one piece of teaching data, the plurality of images being arranged in an order in which pieces of work respectively corresponding to the some pieces of work unit job data are executed, the plurality of pieces of stored work unit job data specifying a motion form of the robot on a work basis, the plurality of pieces of work unit job data each comprising one of a plurality of pieces of job data or a combination of some of the plurality of pieces of job data, the plurality of pieces of job data each specifying a predetermined motion of the robot and being applicable as a part of the at least one piece of teaching data, displaying, on a second window of the display device, a plurality of second images respectively corresponding to the some pieces of the job data constituting a selected job data complex having a combination of some pieces of the job data, displaying, on a first job selection window, a plurality of the pieces of job data in which a desired piece of job data is selectable, displaying, on a second job selection window of the display device, a plurality of the pieces of work unit job data in which a desired piece of work unit job data is selectable, performing an editing operation comprising replacing the some pieces of the stored work unit job data respectively corresponding to the plurality of images with other pieces of the stored work unit job data, and changing the order in which the pieces of work respectively corresponding to the some pieces of the stored work unit job data are executed, and either:

displaying, on at least one of the first window and the second job selection window of the display device, a plurality of third images respectively corresponding to other pieces of work unit job data available to replace the plurality of first images respectively corresponding to the some pieces of the work unit job data, or displaying, on at least one of the first window and the second job selection window of the display device, a plurality of fourth images respectively corresponding to other pieces of the job data available to replace the plurality of pieces of job data respectively corresponding to the plurality of second images, and generating the at least one piece of teaching data based on a display content of the window that has been changed in accordance with the editing operation performed in the editing step; and controlling the robot with a robot controller based on the at least one piece of teaching data.

11. The teaching data generator according to claim 5,
wherein at least one of the second window and the first job selection window comprises a replacing job display area displaying fourth images respectively corresponding to other pieces of the job data available to replace the plurality of pieces of job data respectively corresponding to the plurality of second images, and wherein in response to the information input from the input device, the second job editing section is configured to perform an editing operation comprising replacing the plurality of second images with the fourth images, and changing an arrangement of the plurality of second images.

12. The teaching data generator according to claim 5,
wherein based on control of at least one of the first window display section and the second job selection window display section, the display device is configured to couple the plurality of first images to each other using a plurality of coupling identifiers corresponding to the order in which the pieces of work respectively corresponding to the some pieces of the work unit job data are executed, and configured to display the coupled first images in at least one of the first window and the second job selection window, and wherein in response to the information input from the input device, the first job editing section is configured to perform an editing operation of changing a form in which the plurality of first images are coupled to each other by the plurality of coupling identifiers.

13. The teaching data generator according to claim 6,
wherein based on control of at least one of the first window display section and the second job selection window display section, the display device is configured to couple the plurality of first images to each other using a plurality of coupling identifiers corresponding to the order in which the pieces of work respectively corresponding to the some pieces of the work unit job data are executed, and configured to display the coupled first images in at least one of the first window and the second job selection window, and wherein in response to the information input from the input device, the first job editing section is configured to perform an editing operation of changing a form in which the plurality of first images are coupled to each other by the plurality of coupling identifiers.

14. The teaching data generator according to claim 11,
wherein based on control of at least one of the first window display section and the second job selection window display section, the display device is configured to couple the plurality of first images to each other using a plurality of coupling identifiers corresponding to the order in which the pieces of work respectively corresponding to the some pieces of the work unit job data are executed, and configured to display the coupled first images in at least one of the first window and the second job selection window, and wherein in response to the information input from the input device, the first job editing section is configured to perform an editing operation of changing a form in which the plurality of first images are coupled to each other by the plurality of coupling identifiers.

15. The teaching data generator according to claim 5,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

16. The teaching data generator according to claim 6,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

17. The teaching data generator according to claim 7,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

18. The teaching data generator according to claim 11,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

19. The teaching data generator according to claim 12,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

20. The teaching data generator according to claim 13,
wherein based on control of at least one of the second window display section and the first job selection window display section, the display device is configured to couple the plurality of second images to each other using a plurality of coupling identifiers corresponding to an order in which the predetermined motions respectively corresponding to the plurality of second images are executed, and configured to display the coupled second images in at least one of the second window and the first job selection window, and wherein in response to the information input from the input device, the second job editing section is configured to perform an editing operation of changing a form in which the plurality of second images are coupled to each other by the plurality of coupling identifiers.

* * * * *